(12) United States Patent
Endo et al.

(10) Patent No.: US 8,182,849 B2
(45) Date of Patent: *May 22, 2012

(54) FERMENTED TEA BEVERAGE AND TEA BEVERAGE

(75) Inventors: Rieko Endo, Tokushima (JP); Po Sheng Wu, Tokushima (JP); Satoko Yamahira, Otsu (JP); Masamichi Toba, Otsu (JP); Hiroshi Okamatsu, Otsu (JP)

(73) Assignee: Otsuka Pharmaceutical Co., Ltd., Tokyo (JP)

( * ) Notice: Subject to any disclaimer, the term of this patent is extended or adjusted under 35 U.S.C. 154(b) by 926 days.

This patent is subject to a terminal disclaimer.

(21) Appl. No.: 11/884,273

(22) PCT Filed: Feb. 22, 2006

(86) PCT No.: PCT/JP2006/303145
§ 371 (c)(1),
(2), (4) Date: Aug. 14, 2007

(87) PCT Pub. No.: WO2006/090729
PCT Pub. Date: Aug. 31, 2006

(65) Prior Publication Data
US 2010/0159072 A1    Jun. 24, 2010

(30) Foreign Application Priority Data
Feb. 23, 2005  (JP) .................................. 2005-47882

(51) Int. Cl.
*A23F 3/10* (2006.01)

(52) U.S. Cl. ............ 426/61; 426/597; 426/435; 426/49; 426/52; 435/243; 435/252.9; 424/93.45; 424/115; 424/725; 424/774

(58) Field of Classification Search ...................... 426/61
See application file for complete search history.

(56) References Cited

U.S. PATENT DOCUMENTS 6,228,358 B1 * 5/2001 Toba et al. ................. 424/93.45
6,461,607 B1 * 10/2002 Farmer ....................... 424/93.45

FOREIGN PATENT DOCUMENTS

| CA | 2 535 362 A1 | 3/2005 |
| EP | 0649603 A | 4/1995 |
| JP | 09-220054 A | 8/1997 |

(Continued)

OTHER PUBLICATIONS

Mogens Kilian et al: Defense Mechanisms Involving Fc-Dependent Functions of Immunoglobulin A and Their Subversion by Bacterial Immunoglobulin A Proteases, Microbiological Reviews (1988), vol. 52, No. 2, pp. 296-303.

(Continued)

*Primary Examiner* — Lien T. Tran
*Assistant Examiner* — Philip Dubois
(74) *Attorney, Agent, or Firm* — Sughrue Mion, PLLC

(57) ABSTRACT

The present invention provides a tea-based fermentation beverage comprising a tea-based fermentation liquid with at least one species of lactic acid bacteria selected from the group consisting of *Lactobacillus* ONRIC b0239 (FERM BP-10064) and *Lactobacillus* ONRIC b0240 (FERM BP-10065), and a tea beverage comprising at least one species of lactic acid bacteria selected from the group consisting of *Lactobacillus* ONRIC b0239 (FERM BP-10064) and *Lactobacillus* ONRIC b0240 (FERM BP-10065).

21 Claims, 3 Drawing Sheets

FOREIGN PATENT DOCUMENTS

| | | |
|---|---|---|
| JP | 10-167972 A | 6/1998 |
| JP | 11-4665 A | 1/1999 |
| JP | 11127815 A | 5/1999 |
| JP | 11-276072 A | 10/1999 |
| JP | 2876006 B | 12/1999 |
| JP | 2001-064174 A | 3/2001 |
| JP | 2002-080364 A | 3/2002 |
| JP | 2005013211 A | 1/2005 |

OTHER PUBLICATIONS

Takeshi Ikenaga et al: Enhancement of host resistance against *Salmonella typhimurium* in mice fed a diet supplemented with milk fermented with *Lactobacillus plantarum*, Milk Science (2002), vol. 51, No. 1, pp. 27-32.

Y. Mao et al: Intestinal Immune Response to Oral Administration of *Lactobacillus reuteri* R2LC, *Lactobacillus plantarum* DSM 9843, Pectin and Oatbase on Methotrexate-induced Enterocolitis in Rats, Microbial Ecology in Health and Disease (1996), vol. 9, No. 6, pp. 261-269.

Maria E. Bibas Bonet et al: Optimal Effect of *Lactobacillus delbruecki* subsp. *bulgaricus*, Among Other *Lactobacilli* Species, on the Number of IgA and Mast Cells Associated with the Mucosa in Immunosuppressed Mice, Food and Agricultural Immunology (1999), vol. 11, No. 3, pp. 259-267.

M.V. Herias et al: Immunomodulatory effects of *Lactobacillus plantarum* colonizing the intestine of gnotobiotic rats, Clin Exp Immunol (1999), vol. 116, No. 2, pp. 283-290.

P. Brandtzaeg, Overview of the Mucosal Immune System, Current Topics in Microbiology and Immunology (1989), vol. 146, pp. 13-25.

Steven J. Czinn. et al: Protection of germ-free mice from infection by *Helicobacter felis* after active oral or passive IgA immunization, Vaccine (1993), vol. 11, No. 6, pp. 637-642.

Kathryn B. Renegar. et al: Passive Transfer of Local Immunity to Influenza Virus Infection by IgA Antibody, The Journal of Immunology (1991), vol. 146, No. 6, pp. 1972-1978.

Mogens Kilian et al: Defense Mechanisms Involving Fc-Dependent Functions of Immunoglobulin A and Their Subversion by Bacterial Immunoglobulin A Proteases, Microbiological Reviews (1998), vol. 52, No. 2, pp. 296-303.

Supplementary European Search Report, mailed Jul. 2, 2009 for EP 06714285.1.

Office Action dated Dec. 7, 2011 for Canadian Patent Application No. 2596794.

* cited by examiner

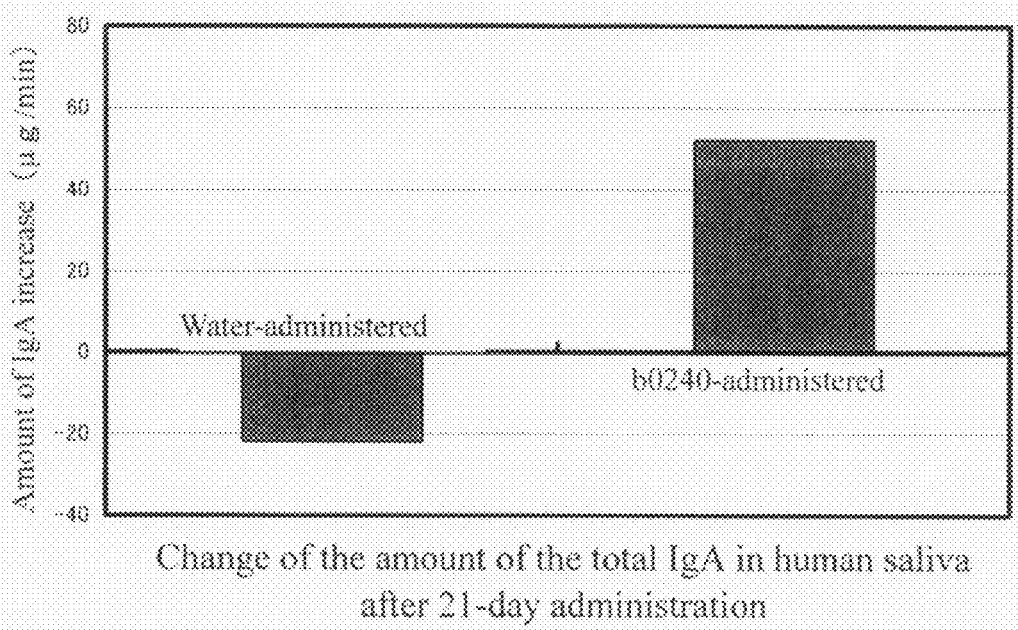

FERMENTED TEA BEVERAGE AND TEA BEVERAGE

This application is a 371 of PCT/JP2006/303145, filed on Feb. 22, 2006, the disclosure of which is incorporated herein by reference.

TECHNICAL FIELD

The present invention relates to tea-based fermentation beverages and tea beverages.

BACKGROUND ART

The following are heretofore known.

(1) Traditional fermentation of tea leaves, and fermented teas including goishi tea, pu-erh tea, miang tea, etc.

(2) A fermented green tea obtained by the following process: bacteria of the species *plantarum* of the genus *Lactobacillus* (lactic acid bacteria), which can proliferate in tea leaves, are separated from tea leaves, and cultured in a liquid medium; and the tea leaves are immersed in hot water, allowed to cool, inoculated with the cultured bacteria and fermented for a predetermined period (Patent Document 1).

(3) A process that can produce a large amount of fermented beverage from tea or coffee, using a yeast and bacteria under easy production conditions and in a relatively short production time (Patent Document 2).

(4) Mucosal immunity is the first phylactic mechanism employed when a pathogen adheres to a mucous membrane (Nonpatent Document 1).

(5) Secretory IgA (S-IgA) in mucus has a defensive activity against pathogens such as bacteria, viruses, etc. (Nonpatent Document 2 and 3), and neutralizes toxins produced by microorganisms (Nonpatent Document 4).

[Patent Document 1] Japanese Patent 2876006
[Patent Document 2] Japanese Unexamined Patent Publication No. 1997-220054
[Nonpatent Document 1] Brandtzaeg, P. Curr. Top. Microbiol. Immunol. 146: 13, 1989
[Nonpatent Document 2] Czinn, S, J. et al., Vaccine 11:637, 1993
[Nonpatent Document 3] Renegar, K. et al., J. Immunol. 146: 1972, 1991
[Nonpatent Document 4] Brandtzaeg, P., APMIS 103: 1, 1995; Kilian, M. et al., Microbiol. Rev. 52: 296, 1988

DISCLOSURE OF THE INVENTION

Problems to be Solved by the Invention

An object of the present invention is to provide a tea fermented with bacteria of the species *plantarum* of the genus *Lactobacillus* (lactic acid bacteria), and a tea containing the bacteria, the teas having high IgA production enhancing activity that has not been heretofore known.

Means for Solving the Problem

The present inventors had previously filed a patent application on an invention relating to *Lactobacillus* ONRIC b0239 (FERM BP-10064) and *Lactobacillus* ONRIC b0240 (FERM BP-10065), which can exhibit excellent mucosal immunity stimulating activity and biophylactic mechanism improving activity and are useful as probiotics (Japanese Patent Application No. 2003-297570, PCT/JP2004/012136).

The present inventors conducted further extensive research and found that the previously found lactic acid bacteria, when added to tea extracts, do not adversely affect the intrinsic taste or flavor of the tea, while retaining their excellent IgA production enhancing activity and mucosal immunity stimulating activity. The present inventors further found that fermentation (culture, proliferation) of these lactic acid bacteria can be easily carried out in tea extracts, and that the tea-based fermentation beverages thus obtained retain the intrinsic taste and flavor of tea without adverse effects, and can exhibit excellent IgA production enhancing activity and mucosal immunity stimulating activity derived from these lactic acid bacteria. The present invention was accomplished as a result of further research based on these findings.

The present invention provides the following items 1 to 23.

1. A tea-based fermentation beverage comprising a tea-based fermentation liquid with at least one species of lactic acid bacteria selected from the group consisting of *Lactobacillus* ONRIC b0239 (FERM BP-10064) and *Lactobacillus* ONRIC b0240 (FERM BP-10065).

2. The tea-based fermentation beverage according to Item 1, further containing a tea extract.

3. The tea-based fermentation beverage according to Item 1 or 2, wherein the lactic acid bacteria is contained in an effective amount for stimulating mucosal immunity.

4. The tea-based fermentation beverage according to Item 1 or 2, wherein the lactic acid bacteria is contained in an effective amount for enhancing IgA production.

5. The tea-based fermentation beverage according to Item 1 or 2, wherein the lactic acid bacteria content is $10^4$ cfu/ml to $10^8$ cfu/ml.

6. The tea-based fermentation beverage according to Item 1 or 2, wherein the lactic acid bacteria content is $10^5$ cfu/ml to $10^7$ cfu/ml.

7. A tea beverage comprising at least one species of lactic acid bacteria selected from the group consisting of *Lactobacillus* ONRIC b0239 (FERM BP-10064) and *Lactobacillus* ONRIC b0240 (FERM BP-10065), and a tea extract.

8. The tea beverage according to Item 7, wherein the lactic acid bacteria is contained in an effective amount for stimulating mucosal immunity.

9. The tea beverage according to Item 7, wherein the lactic acid bacteria is contained in an effective amount for enhancing IgA production.

10. The tea beverage according to Item 7, wherein the lactic acid bacteria content is $10^4$ cfu/ml to $10^8$ cfu/ml.

11. The tea beverage according to Item 7, wherein the lactic acid bacteria content is $10^5$ cfu/ml to $10^7$ cfu/ml.

12. A process for producing the tea-based fermentation beverage according to Item 1, comprising the step of culturing, in a tea-containing medium, at least one species of lactic acid bacteria selected from the group consisting of *Lactobacillus* ONRIC b0239 (FERM BP-10064) and *Lactobacillus* ONRIC b0240 (FERM BP-10065).

13. The process according to Item 12, further comprising the step of adjusting the lactic acid bacteria content of the tea-based fermentation beverage to $10^4$ cfu/ml to $10^8$ cfu/ml.

14. The process according to Item 12 or 13, wherein the tea-containing medium is a tea extract that may contain an optional component or components and has a tea-derived Brix of 0.10 to 0.50, and wherein the culturing is performed at 25° C. to 50° C. for 12 hours to 32 hours.

15. The process according to Item 12 or 13, wherein the tea-containing medium is a tea extract that may contain an optional component or components and has a tea-derived Brix of 0.18 to 0.30, and wherein the culturing is performed at 30° C. to 40° C. for 15 hours to 20 hours.

16. A process for producing the tea-based fermentation beverage according to Item 2, comprising the steps of:

(1) culturing, in a tea-containing medium, at least one species of lactic acid bacteria selected from the group consisting of *Lactobacillus* ONRIC b0239 (FERM BP-10064) and *Lactobacillus* ONRIC b0240 (FERM BP-10065), to obtain a tea-based fermentation liquid; and (2) adding a tea extract to the tea-based fermentation liquid obtained in Step (1).

17. The process according to Item 16, wherein, in Step (2), the tea extract is added to the tea-based fermentation liquid so that the final tea-based fermentation beverage has a tea-derived Brix of 0.10 to 0.50 and a lactic acid bacteria content of $10^4$ cfu/ml to $10^8$ cfu/ml.

18. A process for producing the tea beverage according to Item 7, comprising the step of mixing at least one species of lactic acid bacteria selected from the group consisting of *Lactobacillus* ONRIC b0239 (FERM BP-10064) and *Lactobacillus* ONRIC b0240 (FERM BP-10065), with a tea extract.

19. The process according to Item 18, wherein the tea extract is mixed with the lactic acid bacteria so that the final tea beverage has a tea-derived Brix of 0.10 to 0.50 and a lactic acid bacteria content of $10^4$ cfu/ml to $10^8$ cfu/ml.

20. Use of at least one species of lactic acid bacteria selected from the group consisting of *Lactobacillus* ONRIC b0239 (FERM BP-10064) and *Lactobacillus* ONRIC b0240 (FERM BP-10065), for production of a tea-based fermentation beverage with mucosal immunity stimulating activity.

21. Use of at least one species of lactic acid bacteria selected from the group consisting of *Lactobacillus* ONRIC b0239 (FERM BP-10064) and *Lactobacillus* ONRIC b0240 (FERM BP-10065), for production of a tea-based fermentation beverage with IgA production enhancing activity.

22. Use of at least one species of lactic acid bacteria selected from the group consisting of *Lactobacillus* ONRIC b0239 (FERM BP-10064) and *Lactobacillus* ONRIC b0240 (FERM BP-10065), for production of a tea beverage with mucosal immunity stimulating activity.

23. Use of at least one species of lactic acid bacteria selected from the group consisting of *Lactobacillus* ONRIC b0239 (FERM BP-10064) and *Lactobacillus* ONRIC b0240 (FERM BP-10065), for production of a tea beverage with IgA production enhancing activity.

In the tea-based fermentation beverage and tea beverage of the present invention, the taste of conventional tea is carefully preserved. In particular, the tea-based fermentation beverage of the present invention, despite being fermented, has little or no fermentation smell or the taste that is characteristic of conventional fermented teas or the like. The tea-based fermentation beverage and tea beverage of the present invention enhances IgA production and stimulates mucosal immunity.

The specific lactic acid bacteria for use in the tea-based fermentation beverage and tea beverage of the present invention, and then the tea-based fermentation beverage and tea beverage of the present invention themselves, are described in detail below.

Strains of Lactic Acid Bacteria

The strains of lactic acid bacteria for use in the tea-based fermentation beverage and tea beverage of the present invention are termed *Lactobacillus* ONRIC b0239 (FERM BP-10064) and *Lactobacillus* ONRIC b0240 (FERM BP-10065) (hereinafter sometimes collectively as "ONRIC lactic acid bacteria").

(1) Screening (1-1) Source Microorganisms

The source microorganisms used are lactic acid bacteria separated from human intestinal contents, vegetable foods and animal foods and preserved at the Otsu Nutraceuticals Research Institute of Otsuka Pharmaceutical Co., Ltd.

(1-2) Screening Process

Screening for the target bacteria strains was performed using a mouse Peyer's patch cell culture system using IgA production-inducing capability as an index. The detailed procedures for the screening are as described below in Test example 1.

(2) Microorganisms Obtained by Screening (2-1) *Lactobacillus* ONRIC b0239

(a) Macroscopic Features (a-1) MRS Agar Medium

Circular to slightly irregular, hemispherical, smooth, milky white (a-2) BL Agar Medium Circular to slightly irregular, hemispherical, smooth, whitish brown (b) Microscopic Features

*Bacillus*, nonmotile, sporeless (c) Optimal Growth Temperature 30 to 33° C.

(d) Physiological and Biochemical Features

Gram stainability: positive

| Sugar utilization | |
|---|---|
| Glycerol | − |
| Erythritol | − |
| D-Arabinose | − |
| L-Arabinose | − |
| Ribose | ± |
| D-Xylose | ± |
| L-Xylose | − |
| Adonitol | − |
| β-Methyl-D-Xyloside | − |
| Galactose | + |
| D-Glucose | + |
| D-Fructose | + |
| D-Mannose | + |
| L-Sorbose | − |
| Rhamnose | − |
| Dulcitol | − |
| Inositol | − |
| Mannitol | − |
| Sorbitol | + |
| α-Methyl-D-Mannoside | + |
| α-Methyl-D-Glucoside | ± |
| N-Acetyl-Glucosamine | + |
| Amygdalin | + |
| Arbutin | + |
| Esculin | + |
| Salicin | + |
| Cellobiose | + |
| Maltose | + |
| Lactose | + |
| Melibiose | + |
| Saccharose | + |
| Trehalose | + |
| Inulin | − |
| Melezitose | − |
| D-Raffinose | + |
| Amidon | − |
| Glycogen | − |
| Xylitol | − |
| β-Gentiobiose | + |
| D-Turanose | − |
| D-Lyxose | − |
| D-Tagatose | − |
| D-Fucose | − |

-continued

| Sugar utilization | |
|---|---|
| L-Fucose | − |
| D-Arabitol | ± |
| L-Arabitol | − |
| Gluconate | − |
| 2-Keto-Gluconate | − |
| 5-Keto-Gluconate | − |

From the above various features, the obtained isolate was identified as a strain of *Lactobacillus plantarum* based on the criteria shown in Bergey's Manual of Systematic Bacteriology, and designated *Lactobacillus* ONRIC b0239, and was deposited at an independent administrative corporation, the National Institute of Advanced Industrial Science and Technology International Patent Organism Depositary, AIST Tsukuba Central 6, 1-1, Higashi 1-Chome Tsukuba-shi, Ibaraki-ken, Japan on Aug. 6, 2003, under the accession number of FERM P-19469. Then it was transferred to an international deposit under the Budapest Treaty, and received an accession number of FERM BP-10064.

(2-2) *Lactobacillus* ONRIC b0240
(a) Macroscopic Features
(a-1) MRS Agar Medium
Circular to slightly irregular, hemispherical, smooth, milky white
(a-2) BL Agar Medium
Circular to slightly irregular, hemispherical, smooth, whitish brown
(b) Microscopic Features
*Bacillus*, nonmotile, sporeless
(c) Optimal Growth Temperature
30 to 33° C.
(d) Physiological and Biochemical Features
Gram stainability: positive

| Sugar utilization | |
|---|---|
| Glycerol | − |
| Erythritol | − |
| D-Arabinose | − |
| L-Arabinose | − |
| Ribose | ± |
| D-Xylose | − |
| L-Xylose | − |
| Adonitol | − |
| β-Methyl-D-Xyloside | − |
| Galactose | + |
| D-Glucose | + |
| D-Fructose | + |
| D-Mannose | + |
| L-Sorbose | − |
| Rhamnose | − |
| Dulcitol | ± |
| Inositol | − |
| Mannitol | + |
| Sorbitol | + |
| α-Methyl-D-Mannoside | − |
| α-Methyl-D-Glucoside | − |
| N-Acetyl-Glucosamine | + |
| Amygdalin | + |
| Arbutin | + |
| Esculin | + |
| Salicin | + |
| Cellobiose | + |
| Maltose | + |
| Lactose | + |
| Melibiose | + |
| Saccharose | + |
| Trehalose | − |

-continued

| Sugar utilization | |
|---|---|
| Inulin | − |
| Melezitose | − |
| D-Raffinose | + |
| Amidon | − |
| Glycogen | − |
| Xylitol | − |
| β-Gentiobiose | + |
| D-Turanose | − |
| D-Lyxose | − |
| D-Tagatose | − |
| D-Fucose | − |
| L-Fucose | − |
| D-Arabitol | − |
| L-Arabitol | − |
| Gluconate | − |
| 2-Keto-Gluconate | − |
| 5-Keto-Gluconate | − |

From the above various features, the obtained isolate was identified as a strain of *Lactobacillus plantarum* based on the criteria shown in Bergey's Manual of Systematic Bacteriology, and designated *Lactobacillus* ONRIC b0240, and was deposited at an independent administrative corporation, the National Institute of Advanced Industrial Science and Technology International Patent Organism Depositary, AIST Tsukuba Central 6, 1-1, Higashi 1-Chome Tsukuba-shi, Ibaraki-ken, Japan on Aug. 6, 2003, under the accession number of FERM P-19470. Then it was transferred to an international deposit under the Budapest Treaty, and received an accession number of FERM BP-10065.

Remarkable mucosal immunostimulation and IgA production enhancement achieved by the ONRIC lactic acid bacteria are considered to be brought about as follows: Peyer's patch M cells, which are a constituent of the intestinal immune system, take up an antigen in the lumen. The antigen is presented to CD4 T cells by antigen-presenting cells such as dendritic cells. While immature B cells mature into IgA antibody-producing cells by antigen-specific responses of T cells, the B cells move to the lamina propria mucosae to ultimately differentiate into IgA antibody-producing cells. Although it is not clear how the ONRIC lactic acid bacteria are involved in the IgA production enhancing mechanism, at least antigen uptake by Peyer's patch M cells is necessary for IgA production enhancement due to the presence of the ONRIC lactic acid bacteria. Therefore, the ONRIC lactic acid bacteria are presumed to function as such an antigen. To be functional as an antigen, the ONRIC lactic acid bacteria do not have to be viable cells. The bacteria may be sterilized by conventional heat sterilization procedures.

Tea-Based Fermentation Beverage

The tea-based fermentation beverage of the present invention comprises a tea-based fermentation liquid of at least one species of lactic acid bacteria (ONRIC lactic acid bacteria) selected from the group consisting of *Lactobacillus* ONRIC b0239 (FERM BP-10064) and *Lactobacillus* ONRIC b0240 (FERM BP-10065) as an essential ingredient.

The tea-based fermentation liquid, which is an essential ingredient, can be prepared by cultivating ONRIC lactic acid bacteria in a tea-containing medium. The tea-based fermentation liquid of the present invention comprises the thus-cultivated ONRIC lactic acid bacteria. In the present invention, it is possible to use the tea-containing medium after cultivation and comprising ONRIC lactic acid bacteria as the tea-based fermentation liquid of the present invention without modification.

In the present specification, a tea-containing medium may be a medium that contains a suitable solvent (preferably cold or hot water) and tea leaves and/or pulverized tea leaves (e.g., powder); a tea extract prepared by extracting tea leaves and/or pulverized tea leaves with a suitable solvent (preferably cold or hot water); or that comprises a powder (powdered extract) obtained by making the tea extract into a powder using a spray dryer, etc., in a suitable solvent (preferably cold or hot water). Examples of teas (tea leaves, Tea Sinensis) that can be used as a material for the culture medium include green teas, such as sen-cha (medium-grade green tea), gyokuro (high-quality green tea), twig teas, powdered teas, ban-cha (coarse tea), houji-cha (roasted green tea), genmai-cha (tea with whole rice), ma-cha (powdered green tea), etc.; black teas (English tea), oolong teas, black colored teas (pu-erh tea, miang tea, goishi tea, etc.); and tea-like beverages using other plants, such as herb teas, rooibos tea, ten-cha (sweet tea), hydrangea teas, etc. These teas may be used singly or in combination.

Specific examples of such teas include Tieguanyin tea, Sezhong tea, Shuixian tea, Golden oolong tea, sen-cha, kabuse-cha, etc.

When cold water, hot water, etc., containing one or more of the above-mentioned kinds of tea and/or pulverized leaves is used as the tea-containing medium, there is no limitation on the amount of tea leaves and/or pulverized tea leaves contained in the culture medium; however, the amount of tea leaves and/or pulverized tea leaves used is usually selected in such a manner that the tea-derived Brix of the resultant culture medium is in the range of 0.10 to 0.50, and preferably 0.18 to 0.30.

"Brix" usually indicates soluble drained weight (g) per 100 g of solution and is measured using a differential densitometer (for example, DD-5, a digital differential densitometer manufactured by Atago Co., Ltd.), a refractometer, etc. When a plurality of soluble solid bodies are dissolved in a solution, the Brix is usually expressed as the total soluble drained weight thereof. However, in the present specification, "tea-derived Brix" means the Brix obtained from the soluble solid bodies derived only from tea. In other words, "tea-derived Brix" indicates tea-derived soluble drained weight (g) per 100 g of tea-containing medium, tea extract, end beverage product, etc.

When an extract of the leaves of one or more of the above-mentioned kinds of tea and/or pulverized leaves is used as a tea-containing medium, it is possible to use an extract obtained by extracting such tea leaves with cold or hot water in the same manner as tea is usually served. The concentration of the extract is not limited; however, it is usually selected so that the tea-derived Brix is 0.10 to 0.50, and preferably 0.18 to 0.30.

When cold or hot water containing a powdered extract obtained from the leaves of one or more of the above-mentioned kinds of teas is to be used as the tea-containing medium, specific examples of usable powdered extract include FD green tea extract powder, FD jasmine tea extract powder, FD oolong tea extract powder (these three are manufactured by San-Ei Gen FFI); barley tea extract powder, black tea extract powder, green tea extract powder (these three are manufactured by Takasago International Corporation), etc. Such powdered extracts may be used as a culture medium in the form of an aqueous solution dissolved in cold or hot water. The amount of powdered extract added to cold or hot water is not limited; however, it is usually selected so that the tea-derived Brix of the obtained aqueous solution is in the range of 0.10 to 0.50, and preferably 0.18 to 0.30.

The tea-based fermentation liquid of the present invention can be obtained, for example, by inoculating ONRIC lactic acid bacteria into the tea-containing medium so that the medium contains $10^4$ to $10^8$ cfu/ml, of ONRIC lactic acid bacteria, and then cultivating the medium at 25 to 50° C. for 12 to 32 hours.

For cultivation (fermentation) using ONRIC lactic acid bacteria, it is preferable to prepare a starter in advance by inoculating the lactic acid bacteria into an appropriate fermentation culture medium. A representative example of such a starter is a culture obtained by inoculating ONRIC lactic acid bacteria in the form of cryopreserved cell bodies, lyophilized cell bodies, etc., into a culture medium, such as MRS culture medium or 10% skim milk powder medium, sterilized in the conventional manner at 90 to 121° C. for 5 to 20 minutes beforehand. The starter thus prepared usually contains about $10^4$ to about $10^7$ cfu of ONRIC lactic acid bacteria per gram of culture.

The fermentation culture medium used for the starter may optionally be supplemented with fermentation-promoting substances to ensure good growth of the ONRIC lactic acid bacteria, for example, various carbon sources, such as glucose, starch, sucrose, lactose, dextrin, sorbitol, fructose, etc.; nitrogen sources, such as peptone, etc.; vitamins; and minerals.

As regards the cultivating conditions, the fermentation temperature is generally selected from within the range of about 25 to about 50° C., and preferably about 30 to about 40° C., and the fermentation time is selected from within the range of about 12 to about 32 hours, and preferably about 15 to about 20 hours. Particularly preferable cultivating conditions are 33° C. for 16 hours.

During cultivation (fermentation) of the ONRIC lactic acid bacteria, the tea-containing medium may be supplemented with appropriate amounts of optional components, such as nutrients, etc., suitable for the maintenance and growth of the lactic acid bacteria. Specific examples include nutrients utilized in media for cultivating microorganisms, for example, various carbon sources, such as glucose, starch, sucrose, lactose, dextrin, sorbitol, fructose, etc.; nitrogen sources, such as peptone, etc.; vitamins; minerals; trace elements (metals); and other nutrients. Examples of such vitamins include vitamin B, vitamin D, vitamin C, vitamin E, and vitamin K. Examples of such trace elements include zinc, selenium, etc. Examples of other such nutrients include various oligosaccharides, such as lactooligosaccharides, soy oligosaccharides, lactulose, lactitol, fructooligosaccharides, and galactooligosaccharides. The amount of such oligosaccharides to be incorporated is not particularly limited but is preferably selected within a range such that the concentration thereof in the composition of the invention is not greater than about 3 weight %.

The thus-obtained tea-based fermentation liquid may be used as the tea-based fermentation beverage of the present invention without modification. The tea-based fermentation beverage of the present invention may also be produced by dissolving a powdered extract obtained by lyophilizing the tea-based fermentation liquid into water, etc. It is also possible to obtain the tea-based fermentation beverage of the present invention by concentrating or diluting the thus-obtained tea-based fermentation liquid with water, etc., or by adding a tea extract to the tea-based fermentation liquid. Here, the tea extract added to the tea-based fermentation liquid is the same as that obtained by extracting the tea leaves and/or pulverized tea leaves used in the tea-containing medium with a suitable solvent (preferably cold or hot water). It is also possible to use a tea extract by dissolving a powder (powdered extract) obtained by rendering the tea extract into a powder using a spray dryer, etc., into cold water, hot water, etc. The concentration thereof is not limited.

In either case, i.e., whether a tea-based fermentation liquid is used or a lyophilisate thereof is used, the content of ONRIC lactic acid bacteria in the tea-based fermentation beverage of the present invention is suitably selected from within the range of about $10^4$ to about $10^8$ cfu/mL, and preferably about $10^5$ to about $10^7$ cfu/mL. The lactic acid bacteria content may be controlled by changing the cultivating conditions of the tea-containing medium, the number of cells inoculated, etc., or by concentrating or diluting the tea-based fermentation liquid. When a powdered extract of the tea-based fermentation liquid is used, the content of ONRIC lactic acid bacteria may be controlled by changing the amount of the powdered extract added.

When the tea-based fermentation beverage of the present invention is produced by mixing a tea-based fermentation liquid with a tea extract, the contents of the tea-based fermentation liquid and tea extract are not limited and may be suitably selected in such a manner that the tea-based fermentation beverage of the present invention produced by mixing the two ingredients contains the lactic acid bacteria in the range of, for example, $10^4$ cfu/ml, to $10^8$ cfu/mL, and preferably $10^5$ cfu/mL to $10^7$ cfu/mL, and the tea-derived Brix of the tea-based fermentation beverage is in the range of 0.10 to 0.50, and more preferably 0.18 to 0.30.

Here, cfu (colony forming unit) is represented by the viable cell count measured by the following method, and does not mean that the beverage actually contains that number of viable cells. In other words, the beverage of the present invention may be sterilized by conventional heat sterilization procedures before being made into a final product, and therefore viable cells need not exist in the product. In such a case, the product contains dead cells equivalent to the viable cell count measured before sterilization, achieving the effects intended by the present invention. In the present specification, the number of cells in a beverage subjected to sterilization is shown by the viable cell count measured before sterilization.

<Measurement of the Number of Lactic Acid Bacteria>

The viable cell count is determined by cultivating a pour culture at 33° C. using a BCP-containing plate count agar medium, and counting the colonies formed. As the viable cell count and turbidity correlate with each other, if this correlation between the viable cell count and turbidity is determined beforehand, the viable cell count can therefore be calculated by determining the turbidity instead of counting the viable cells. The amount of ONRIC lactic acid bacteria to be incorporated in the tea-based fermentation beverage of the present invention can be suitably adjusted according to the type of beverage to be produced, the kind of lactic acid bacteria used, etc., using the above-mentioned range as a guide.

The tea-based fermentation beverage of the present invention may further comprise suitable edible carriers (food materials), if necessary, in the same manner as usual foods and beverages.

Thus, the tea-based fermentation beverage of the present invention is obtained. The tea-based fermentation beverage of the present invention thus obtained can be aseptically dispensed into suitable containers to provide end products. The thus-obtained products have the flavor inherent to tea as well as the mucosal immunity stimulating activity or IgA production enhancing activity attributable to the ONRIC lactic acid bacteria.

The amount administered (intake amount) of the tea-based fermentation beverage of the present invention can be suitably selected according to the age, gender, body weight, and severity of illness of the recipient, etc., and is not particularly limited. Generally, the tea-based fermentation beverage of the present invention can be given to a human body in a quantity per day that corresponds to a viable cell count, calculated as the number of ONRIC lactic acid bacteria, of about $10^6$ to about $10^{10}$ cfu. Therefore, depending on the viable cell count of the beverage, it is preferable that the intake amount of the tea-based fermentation beverage of the present invention be about 50 to about 1,000 mL/day.

The present invention also provides for the use of at least one type of lactic acid bacteria selected from the group consisting of Lactobacillus ONRIC b0239 (FERM BP-10064) and Lactobacillus ONRIC b0240 (FERM BP-10065) for producing tea-based fermentation beverages having a mucosal immunity stimulating activity or IgA production enhancing activity.

Tea Beverage

The invention also provides a tea beverage containing at least one species of lactic acid bacteria (ONRIC lactic acid bacterium) selected from the group consisting of Lactobacillus ONRIC b0239 (FERM BP-10064) and Lactobacillus ONRIC b0240 (FERM BP-10065). This tea beverage contains such a lactic acid bacterium and tea extract as essential ingredients.

Here, the ONRIC lactic acid bacteria may be cell bodies isolated from the tea-fermented liquid used for obtaining the tea-based fermentation beverage of the present invention, or lyophilisates thereof.

The lactic acid bacteria used for producing the tea beverage of the present invention may be in the form of a culture solution containing ONRIC lactic acid bacteria cultivated in a suitable culture medium that does not contain tea, or may be in the form of a cell body isolated from such a culture solution or lyophilisates thereof.

Examples of a culture medium free of tea include the above-described MRS medium, 10% skim milk powder medium and other nutritional culture media generally used for cultivating lactic acid bacteria, as well as liquids containing, for example, fluids derived from vegetables or fruits, soy milk (soybean emulsion), etc., as a fermentation material.

The lactic acid bacteria used for producing the tea beverage of the present invention may be in the form of a fermentation liquid (culture solution) obtained by cultivating the ONRIC lactic acid bacteria in the liquid, or crude or purified products of such cultures obtained using the fermentation liquid, and lyophilisates thereof.

Vegetables and fruits for use as the fermentation material include cuttings, crushings, grindings, squeezed juices, enzyme-treated products, and dilutions and concentrates thereof. Usable vegetables include, for example, pumpkins, carrots, tomatoes, sweet peppers, celery, spinach, colored sweet potatoes, corn, beets, kale, parsley, cabbages, and broccoli. Usable fruits include, for example, apples, peaches, bananas, strawberries, grapes, watermelons, navel oranges, and mandarin oranges.

Cuttings, crushings, or grindings of vegetables or fruits can be obtained by, for example, a procedure comprising washing at least one vegetable and/or fruit, and where necessary, subjecting it to a blanching treatment, e.g. placing in hot water, and then cutting, pulverizing or grinding it by means of a crusher, mixer, food processor, pulverizer, Mycolloider™ (product of Tokushu Kika Kogyo Co. Ltd.), or the like. Squeezed juices can be prepared by using a filter press, juicer-mixer, or the like. Squeezed juices can also be prepared by filtering grindings through a filter cloth or the like. Enzyme-treated products can be prepared by permitting cellulase, pectinase, protopectinase or the like to act upon cuttings, crushings, grindings, or squeezed juices. Dilutions include 1- to 50-fold aqueous dilutions. Concentrates include those concentrated 1- to 100-fold by such means as freeze concentration, concentration under reduced pressure, etc.

Soy milk, which is another specific example of fermentation material, can be prepared from soybean materials in the conventional manner. Examples of such soy milks include homogenates prepared by immersing skinned soybeans in water, wet-pulverizing the soybeans with a suitable mill such as a colloid mill and homogenizing the pulverizate in the conventional manner, and solutions of water-soluble soy protein in water.

For fermentation using lactic acid bacteria, it is preferable to prepare a starter beforehand and inoculate the fermentation material with the starter. A representative example of such a starter is a culture obtained by inoculating the ONRIC lactic acid bacteria into a fermentation material-supplemented 10% skim milk powder medium sterilized in the conventional manner at 90 to 121° C. for 5 to 20 minutes beforehand, and then incubating the ONRIC lactic acid bacteria. A starter thus prepared usually contains about $10^7$ to about $10^9$ cfu of ONRIC lactic acid bacteria per gram of culture.

The fermentation material used for the starter may optionally be supplemented with fermentation-promoting substances that ensure good growth of the ONRIC lactic acid bacteria, for example, various carbon sources, such as glucose, starch, sucrose, lactose, dextrin, sorbitol, fructose, etc.; nitrogen sources, such as peptone, etc.; vitamins; and minerals.

With regard to the cultivating conditions, the fermentation temperature is generally selected from within the range of about 20 to about 45° C., and preferably about 25 to about 37° C., and the fermentation time is selected from within the range of about 10 to about 30 hours.

The tea extract, which is another essential ingredient of the tea beverage of the present invention, is the same as that added to the tea-based fermentation liquid in producing the above-described tea-based fermentation beverage of the present invention.

The contents of ONRIC lactic acid bacteria and tea extract are not limited and may be suitably selected in such a manner that the tea beverage of the present invention produced by mixing the two essential ingredients contains the lactic acid bacteria in the range of, for example, $10^4$ cfu/mL to $10^8$ cfu/mL, and preferably $10^5$ cfu/mL to $10^7$ cfu/mL, and the tea-derived Brix of the tea beverage is in the range of 0.10 to 0.50, and more preferably 0.18 to 0.30.

Thus, the tea beverage of the present invention is obtained. The tea beverage of the present invention thus obtained can be aseptically dispensed into suitable containers to provide end products. The thus-obtained product has the flavor inherent to tea as well as the mucosal immunity stimulating activity or IgA production enhancing activity attributable to the ONRIC lactic acid bacteria.

The amount administered (intake amount) of the tea beverage of the present invention can be suitably selected according to the age, gender, body weight, and severity of illness of the recipient, etc., and is not particularly limited. Generally, the tea beverage of the present invention can be given to a human body in a quantity per day that corresponds to a viable cell count, calculated as the number of ONRIC lactic acid bacteria, of about $10^6$ to about $10^{10}$ cfu. Therefore, depending on the viable cell count of the beverage, it is preferable that the intake amount of the tea beverage of the present invention be about 50 to about 1,000 mL/day.

The present invention also provides for the use of at least one type of lactic acid bacteria selected from the group consisting of *Lactobacillus* ONRIC b0239 (FERM BP-10064) and *Lactobacillus* ONRIC b0240 (FERM BP-10065) for producing tea beverages having a mucosal immunity stimulating activity or IgA production enhancing activity.

Effects of the Invention

The present invention provides a tea-based fermentation beverage and tea beverage that retain the intrinsic taste and flavor of tea without being adversely affected, and has excellent IgA production enhancing activity and mucosal immunity stimulating activity. Ingestion of these beverages is presumed to strengthen the biophylaxis due to the excellent IgA production enhancing activity and mucosal immunity stimulating activity.

Various tastes and flavors, such as, for example, a light flavor and refreshing sourness, a light flavor and clear taste, or a dark brown color and mild taste, can be imparted to the tea-based fermentation beverage and tea beverage of the present invention by using different kinds of tea leaves as raw materials and/or different proportions of the tea-based fermentation liquid, tea extract, etc. The beverages of the invention have constantly enjoyable flavor and taste that are intrinsic to tea.

BRIEF DESCRIPTION OF THE DRAWINGS

FIG. 3 is a chart showing the change in the total S-IgA amount in human saliva on the $21^{st}$ day after administration of *Lactobacillus* ONRIC b0240 (non-viable cells) ($2\times10^9$ cfu equivalent/day).

BEST MODE FOR CARRYING OUT THE INVENTION

Figure 1:
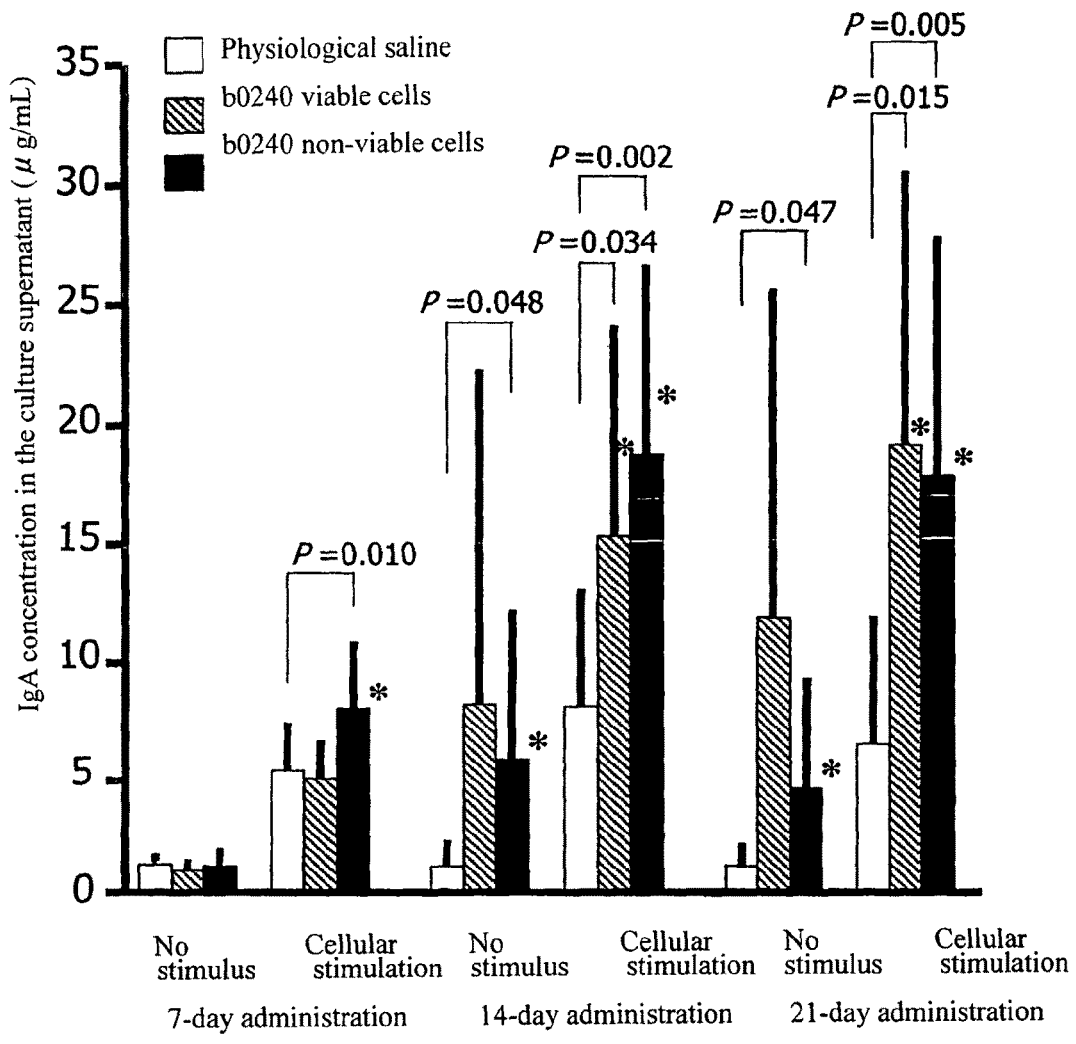
FIG. 1 is a chart showing the effects of the administration of *Lactobacillus* ONRIC b0240 on IgA production of Peyer's patch cells.

Given below are Examples describing the production processes for the tea-based fermentation beverage and tea beverage of the present invention, and Test Examples on the specific lactic acid bacteria used in the tea-based fermentation beverage and tea beverage of the present invention. The Examples and Test Examples are provided to illustrate the present invention in further detail, and are not intended to limit the scope of the invention.

In the Examples and Test Examples, percentages are by weight unless otherwise stated.

Example 1

Production Process 1 of Tea-Based Fermentation Beverages (1) Production of Freeze-Preserved Bacterial Cells
Pre-Preliminary Culturing 100 μL of *Lactobacillus* ONRIC b0240 (FERM BP-10065) freeze-preserved at −80° C. was defrosted and added to 10 mL of MRS liquid medium (manufactured by Difco) sterilized in an autoclave at 121° C. for 15 minutes. The resulting mixture was subjected to stationary culturing at 33° C. for 16 hours, preparing a pre-preliminary culture liquid of the *Lactobacillus* ONRIC b0240 (cell count: about $10^9$ cfu/mL).

Preliminary Culturing

100 μL of the pre-preliminary culture liquid prepared above was inoculated into 10 mL of MRS liquid medium (manufactured by Difco) sterilized in an autoclave at 121° C. for 15 minutes, followed by stationary culturing at 33° C. for 16 hours, preparing a preliminary culture liquid of the *Lactobacillus* ONRIC b0240 (cell count: about $10^9$ cfu/mL).

Culturing 10 mL of the preliminary culture liquid prepared above was inoculated into 1 L of MRS liquid medium (manufactured by Difco) sterilized in an autoclave at 121° C. for 15 minutes, followed by stationary culturing at 33° C. for 16 hours, preparing a culture liquid of the *Lactobacillus* ONRIC b0240 (cell count: about $10^9$ cfu/mL).

Harvesting and Washing

1 L of the culture liquid was centrifuged at 11000 rpm for 10 minutes to collect bacterial cells, followed by washing with phosphate-buffered saline that had been sterilized in an autoclave at 121° C. for 15 minutes. A further centrifugation was carried out to collect the bacterial cells. The collected bacterial cells were washed again with phosphate-buffered saline that had been sterilized, and collected by centrifugation. Separately, 2 g of green tea extract powder (San-Ei Gen F.F.I., Inc.) was dissolved in 1000 g of deionized water. The collected bacterial cells were suspended in the solution, which had been sterilized in an autoclave at 121° C. for 15 minutes, and the suspension was preserved at −80° C. The cell count of the freeze-preserved bacterial cells thus obtained was $1.6 \times 10^9$ cfu/mL.

(2) Production of Tea-Based Fermentation Beverages 3.4 g of green tea extract powder (San-Ei Gen F.F.I., Inc.) was added to 2000 g of deionized water and heated to 60° C. to dissolve the extract by stirring at the same temperature for 10 minutes. The solution obtained was cooled to room temperature, and 2000 mL of the solution was transferred into a sterilized reagent bottle. The tea-derived Brix of the solution was 0.32.

200 µL of freeze-preserved *Lactobacillus* ONRIC b0240 (FERM BP-10065, cell count: $1.6 \times 10^9$ cfu/mL) was inoculated into the reagent bottle. The reagent bottle content after inoculation was warmed at 33° C. for 16 hours, followed by stationary culturing, preparing a green tea-based fermentation liquid. The lactic acid bacterial cell count of the liquid was $10^7$ cfu/mL.

Separately, 1000 mL of deionized water having a temperature of 93° C. was added to 20 g of oolong tea (Mitsui Norin Co., Ltd.), and stirred three times at 6 minute intervals, i.e., at the start, middle, and end. The obtained tea-leaf-containing liquid was filtrated with a stainless steel filter, and the filtrate was cooled over an ice bath to 30° C. or lower. The cooled filtrate was diluted with 2000 mL of deionized water. The tea-derived Brix of the obtained tea extract was 0.24.

1000 mL of green tea-based fermentation liquid prepared above was mixed with 1000 mL of oolong tea (tea extract). 500 mg/L of vitamin C was added to the mixture. The liquid mixture obtained was sterilized by heat, and poured into suitable containers, preparing tea-based fermentation beverages of the invention.

The tea-based fermentation beverages thus prepared had a light flavor and refreshing sourness. The pH was 5.2 and the cell count was $5.2 \times 10^6$ cfu/ml.

The tests of the following Test examples showed that the tea-based fermentation beverages of the invention have excellent IgA production enhancing activity and mucosal immunity stimulating activity.

Example 2

Production Process 2 of Tea-Based Fermentation Beverages (1) Production of Freeze-Preserved Bacteria Cells Pre-Preliminary Culturing 100 µL of *Lactobacillus* ONRIC b0240 (FERM BP-10065) freeze-preserved at −80° C. was defrosted and added to 10 mL of MRS liquid medium (manufactured by Difco) sterilized in an autoclave at 121° C. for 15 minutes. The resulting mixture was subjected to stationary culturing at 33° C. for 16 hours, preparing a pre-preliminary culture liquid of the *Lactobacillus* ONRIC b0240 (cell count: about $10^9$ cfu/mL).

Preliminary Culturing

100 µL of the pre-preliminary culture liquid prepared above was inoculated into 10 mL of MRS liquid medium (manufactured by Difco) sterilized in an autoclave at 121° C. for 15 minutes, followed by stationary culturing at 33° C. for 16 hours, preparing a preliminary culture liquid of the *Lactobacillus* ONRIC b0240 (cell count: about $10^9$ cfu/mL).

Culturing 10 mL of the preliminary culture liquid prepared above was inoculated into 1 L of MRS liquid medium (manufactured by Difco) sterilized in an autoclave at 121° C. for 15 minutes, followed by stationary culturing at 33° C. for 16 hours, preparing a culture liquid of the *Lactobacillus* ONRIC b0240 (cell count: about $10^9$ cfu/mL).

Harvesting and Washing

1 L of the culture liquid was centrifuged at 11000 rpm for 10 minutes to collect bacterial cells, followed by washing with phosphate-buffered saline that had been sterilized in an autoclave at 121° C. for 15 minutes. A further centrifugation was carried out to collect the bacterial cells. The collected bacterial cells were washed again with phosphate-buffered saline that had been sterilized, and collected by centrifugation. Separately, 20 g of green tea extract powder (San-Ei Gen F.F.I., Inc.) was dissolved in 1000 g of deionized water. The collected bacterial cells were suspended in the solution, which had been sterilized in an autoclave at 121° C. for 15 minutes, and the suspension was freeze-dried. The cell count of the freeze-preserved bacterial cells thus obtained was $3.7 \times 10^9$ cfu/g.

(2) Production of Tea-Based Fermentation Beverages 4 g of green tea extract powder (San-Ei Gen F.F.I., Inc.) was added to 2000 g of deionized water and heated to 60° C. to dissolve the extract by stirring at the same temperature for 10 minutes. The solution obtained was cooled to room temperature, and 2000 mL of the solution was transferred into a reagent bottle. The tea-derived Brix of the solution was 0.36.

25 mg of freeze-dried *Lactobacillus* ONRIC b0240 (FERM BP-10065, cell count: $3.7 \times 10^9$ cfu/g) was inoculated into the reagent bottle. The reagent bottle content after inoculation was warmed at 33° C. for 16 hours, and the bacterial cells were subjected to stationary culturing (estimated initial cell count: $5 \times 10^4$ cfu/mL).

500 mg/L of vitamin C was added to the culture liquid thus obtained. The liquid mixture obtained was sterilized by heat, and poured into suitable containers, preparing the tea-based fermentation beverages of the invention.

(3) Quality Assessment of the Tea-Based Fermentation Beverages

The tea-based fermentation beverages obtained had the following physical properties.

<The Tea-Based Fermentation Beverage of the Invention Obtained Using Freeze-Dried Bacteria>

PH: 4.75

Cell Count: $4.1 \times 10^6$ cfu/mL (as measured by the method for measuring the cell count of lactic acid bacteria of the Japanese Food Sanitation Law)

Turbidity: 0.038 (measured by a spectrophotometer U-3000, manufactured by Hitachi, Ltd.)

Lactic acid content: 14.8 mg/100 mL (measured by a high performance liquid column chromatography, manufactured by JASCO)

Acetic acid content: 0.6 mg/100 mL
(measured by a high performance liquid column chromatography, manufactured by JASCO)
Citric acid content: 1.2 mg/100 mL
(measured by a high performance liquid column chromatography, manufactured by JASCO)
Tea-derived Brix: 0.24 (measured by a digital differential refractometer DD-5, manufactured by Atago CO., Ltd.)
Sensory evaluation: Tea flavor and sourness (experimental tea at 4° C. was sampled for evaluation).

The tests of the following Test examples showed that the tea-based fermentation beverages of the invention have excellent IgA production enhancing activity and mucosal immunity stimulating activity.

Example 3

Production Process 1 of Tea Beverages 1000 mL of deionized water having a temperature of 93° C. was added to 40 g of oolong tea (Mitsui Norin Co., Ltd.), and stirred three times at 6 minute intervals, i.e., at the start, middle, and end. The obtained tea-leaf-containing liquid was filtrated with a stainless steel filter, and the filtrate was cooled over an ice bath to 30° C. or lower. The tea-derived Brix of the obtained tea extract was 0.96.

Separately, 1 mL of freeze-preserved bacterial cells of *Lactobacillus* ONRIC b0240 (FERM P-10065) (prepared in Example 1-(1)) was inoculated into 1000 mL of aqueous solution containing 15% carrot juice, followed by culturing at 33° C. for 24 hours. The culture liquid was separated by centrifugation, and sterilized at 60° C. for 10 minutes or more, preparing a concentrated bacteria-containing liquid (cell content: about $10^{10}$ cfu/mL).

4 mL of concentrated bacteria-containing liquid of the *Lactobacillus* ONRIC b0240 was added to 1000 mL of the oolong tea filtrate (tea extract liquid). 500 mg/L of vitamin C was added to the liquid mixture obtained, and the total amount was diluted with water to 4000 mL. The diluted liquid mixture was poured in suitable containers, producing tea beverage products of the invention.

The tea beverages thus obtained had a light flavor and clear taste. The pH was 5.5 and the cell count was $2.6 \times 10^7$ cfu/mL.

The tests of the following Test examples showed that the tea beverages of the invention have excellent IgA production enhancing activity and mucosal immunity stimulating activity.

Example 4

Production Process 2 of Tea Beverages

The tea beverages of the invention were prepared following the procedure of Example 3 except that, as a starting material, pu-erh tea (Mitsui Norin Co., Ltd.) was used in place of oolong tea and *Lactobacillus* ONRIC b0239 (FERM P-10064 (freeze-preserved bacterial cells prepared in the same manner as in Example 1-(1)) was used in place of *Lactobacillus* ONRIC b0240 (FERM P-10065).

The tea beverages of the invention showed dark brown, had mild taste and characteristic flavor. The pH was 5.5, and the cell count was $2.6 \times 10^7$ cfu/mL.

The tests of the following Test examples showed that the tea beverages of the invention have excellent IgA production enhancing activity and mucosal immunity stimulating activity.

Example 5

Production Process 3 of Tea-Based Fermentation Beverages

The tea-based fermentation beverages of the invention were prepared following the procedure of Example 2 except that *Lactobacillus* ONRIC b0239 (FERM P-10064) was used in place of *Lactobacillus* ONRIC b0240 (FERM P-10065).

The tea-based fermentation beverages of the invention had tea flavor and sourness. The pH was 5.0, and the cell count was $4.0 \times 10^6$ cfu/mL.

The tests of the following Test examples showed that the tea-based fermentation beverages of the invention have excellent IgA production enhancing activity and mucosal immunity stimulating activity.

Example 6

Production Process 4 of Tea-Based Fermentation Beverages

The tea-based fermentation beverages of the invention were prepared following the procedure of Example 1 except that, as a starting material, black tea extract powder was used in place of green tea extract powder; black tea was used in place of oolong tea; and *Lactobacillus* ONRIC b0239 (FERM P-10064; freeze-preserved bacterial cells) was used in place of *Lactobacillus* ONRIC b0240 (FERM P-10065).

The tea-based fermentation beverages of the invention retained black tea taste. The pH was 5.8, and the cell count was $1.2 \times 10^7$ cfu/mL.

The tests of the following Test examples showed that the tea-based fermentation beverages of the invention have excellent IgA production enhancing activity and mucosal immunity stimulating activity.

Test Example 1

In this Example, the IgA production-inducing capabilities of the ONRIC lactic acid bacteria were tested in vitro using a Peyer's patch cell culture system according to the methods described in Yasui et al. and Ikenaga et al. [Yasui, H., et al., Microbial Ecology in Heath and Disease, 5, 155 (1992); Ikenaga, T., et al., Milk Science, 51, 27 (2002)]. The test procedures are as follows.
(1) Experimental Animals
Female mice of inbred strain SPF/VAF BALB/c AnNCrj were used.
The obtained test mice were quarantined for one week. During the quarantine period, an MF solid diet (product of Oriental Yeast Co. Ltd.) and tap water were supplied ad libitum.
(2) Peyer's Patch Cell Culture Method
After the quarantine period, 80 mice were divided into 8 groups of 10 mice each in such a manner that the average body weight of each group was essentially the same. After grouping, ten mice were sacrificed every day to take out the small intestine and dissect out the Peyer's patches from the small intestine. The Peyer's patches were cooled with ice in a centrifugation tube containing MEM [Eagle's MEM (product of NISSUI), 2 mM glutamine (product of GIBCO), 1 mM sodium pyruvate (product of GIBCO), and MEM nonessential amino acids (product of GIBCO)]. The cells were passed through a mesh to prepare a single cell suspension and washed well with 5 mL of MEM. The cell suspension was filtered and centrifuged at 4° C. at 1,000 rotations/minute for 10 minutes. After centrifugation, the culture supernatant was removed by suction and the precipitate was suspended in 5 mL of MEM. After this procedure had been repeated twice, the precipitate was suspended in 10 mL of MEM containing 5% FBS (product of GIBCO), and the number of viable Peyer's patch cells was counted. The cell suspension was inoculated into a 96-well plate to prepare a cell culture plate.

(3) Preparation of Test Cells

*Lactobacillus* ONRIC b0239 (FERM BP-10064) and *Lactobacillus* ONRIC b0240 (FERM BP-10065) were used as test cells. These bacteria were cultured in media suitable for their cultivation until the stationary growth phase was reached and the resulting cultures were then centrifuged at 7,000 g for 10 minutes (4° C.). The cells were washed three times with PBS(−) and suspended in 5 mL of physiological saline. To determine the cell count, turbidity was measured at 660 nm. The cells were then sterilized by autoclaving at 100° C. for 30 minutes. A turbidity of 1.0 at 660 nm was determined to be equivalent to $2.0 \times 10^9$ cells/mL.

(4) Determination of IgA Concentration in Culture Supernatants

The Peyer's patch cells prepared above in (2) above were suspended in MEM containing 5% FBS and adjusted to $2.5 \times 10^6$ cells/mL, and 200 μL of the suspension was inoculated into a 96-well cell culture plate. Twenty μL portions of the test cell suspension at a concentration of $2.0 \times 10^9$ cells/mL prepared above in (3) were added to each well of the plate and cultured at 37° C. in the presence of 5% $CO_2$ for 7 days.

Twenty μL of LPS (Lipopolysaccharide) at a concentration of 50 μg/mL was used as a positive control instead of 20 μL of the above cells.

Subsequently, the total IgA concentrations of the resulting culture supernatants were determined by ELISA using a commercially available kit.

(5) IgA Production Enhancing Activity of ONRIC Lactic Acid Bacteria

Table 1 below shows the IgA production enhancing activity of ONRIC lactic acid bacteria in terms of stimulation index (S.I.), i.e., the total IgA concentrations of supernatants containing ONRIC lactic acid bacteria as determined above in (4) relative to that of a control culture supernatant prepared by adding 10 μL of PBS(−) to MEM and culturing the cell-free medium in a similar manner for 7 days as a reference (1.0).

The test results using various known lactic acid bacteria are shown in Tables 1 to 4. The test results of the positive control (LPS 50 μg/mL) are indicated as "Positive Control (LPS)". The abbreviations shown under "Strain No." in the tables stand for the following microorganism depositories:

ATCC: American Type Culture Collection; Manassas, Va., U.S.A.

JCM: Japan collection of Microorganism, The Institute of Physical and Chemical Research, RIKEN NRIC: NODAI Culture Collection Center, Tokyo University of Agriculture; Setagaya-ku, Tokyo, Japan

TABLE 1

| Strain No. | | Genus | Species | Subsp. | IgA S.I. |
|---|---|---|---|---|---|
| | | Control (PBS) | | | 1 |
| | | Positive Control (LPS) | | | 13.1 |
| ONRIC | b0239 | *Lactobacillus* | *plantarum* | | 5.61 |
| ONRIC | b0240 | *Lactobacillus* | *plantarum* | | 6.31 |
| ATCC | 43121 | *Lactobacillus* | *acidophilus* | | 1.10 |
| JCM | 1059 | *Lactobacillus* | *brevis* | | 1.20 |
| JCM | 1115 | *Lactobacillus* | *buchneri* | | 1.17 |
| JCM | 1134 | *Lactobacillus* | *casei* | *casei* | 1.03 |
| JCM | 1096 | *Lactobacillus* | *curvatus* | | 1.63 |
| JCM | 1002 | *Lactobacillus* | *delbrueckii* | *bulgaricus* | 1.23 |
| JCM | 1012 | *Lactobacillus* | *delbrueckii* | *delbrueckii* | 1.41 |
| JCM | 1248 | *Lactobacillus* | *delbrueckii* | *lactis* | 1.31 |
| JCM | 1173 | *Lactobacillus* | *fermentum* | | 1.08 |
| JCM | 1131 | *Lactobacillus* | *gasseri* | | 1.15 |
| JCM | 1155 | *Lactobacillus* | *hilgardii* | | 1.11 |
| JCM | 2012 | *Lactobacillus* | *johnsonii* | | 1.11 |
| JCM | 8572 | *Lactobacillus* | *kefirgranum* | | 1.08 |
| JCM | 5818 | *Lactobacillus* | *kefiri* | | 1.21 |
| JCM | 8130 | *Lactobacillus* | *paracasei* | *paracasei* | 1.11 |
| JCM | 1171 | *Lactobacillus* | *paracasei* | *tolerans* | 1.11 |
| JCM | 1149 | *Lactobacillus* | *plantarum* | | 1.66 |
| JCM | 1551 | *Lactobacillus* | *plantarum* | | 1.14 |
| JCM | 8341 | *Lactobacillus* | *plantarum* | | 1.18 |
| JCM | 1112 | *Lactobacillus* | *reuteri* | | 1.15 |
| ATCC | 7469 | *Lactobacillus* | *rhamnosus* | | 1.05 |
| JCM | 1157 | *Lactobacillus* | *sakei* | *sakei* | 1.52 |
| JCM | 1150 | *Lactobacillus* | *salivarius* | *salicinius* | 1.06 |
| JCM | 1231 | *Lactobacillus* | *salivarius* | *salivarius* | 1.14 |
| JCM | 9504 | *Lactobacillus* | *suebicus* | | 1.28 |
| JCM | 5885 | *Pediococcus* | *acidilactici* | (*pentosaceus*) | 1.51 |
| JCM | 5890 | *Pediococcus* | *pentosaceus* | | 1.44 |
| JCM | 6124 | *Leuconostoc* | *mesenteroides* | *mesenteroides* | 1 |
| NRIC | 0103 | *Enterococcus* | *faecalis* | | 1.06 |
| NRIC | 0110 | *Enterococcus* | *faecalis* | | 1.08 |
| NRIC | 0134 | *Lactobacillus* | *brevis* | | 1.07 |
| NRIC | 0137 | *Lactobacillus* | *brevis* | | 1.13 |
| NRIC | 1713 | *Lactobacillus* | *brevis* | | 1.08 |
| NRIC | 1950 | *Lactobacillus* | *brevis* | | 1.12 |
| NRIC | 1964 | *Lactobacillus* | *brevis* | | 1.07 |
| NRIC | 1965 | *Lactobacillus* | *brevis* | | 1.07 |

TABLE 2

| Strain No. | Genus | Species | Subsp. | IgA S.I. |
|---|---|---|---|---|
| NRIC1042 | Lactobacillus | casei | casei | 1.00 |
| NRIC1597 | Lactobacillus | casei | casei | 0.96 |
| NRIC1917 | Lactobacillus | casei | casei | 1.01 |
| NRIC1941 | Lactobacillus | casei | casei | 1.02 |
| NRIC1962 | Lactobacillus | casei | casei | 1.00 |
| NRIC1963 | Lactobacillus | casei | casei | 1.05 |
| NRIC1968 | Lactobacillus | casei | casei | 1.07 |
| NRIC1975 | Lactobacillus | curvatus | | 1.02 |
| NRIC1976 | Lactobacillus | curvatus | | 1.14 |
| NRIC1977 | Lactobacillus | curvatus | | 1.04 |
| NRIC1978 | Lactobacillus | curvatus | | 1.11 |
| NRIC1979 | Lactobacillus | curvatus | | 0.99 |
| NRIC0191 | Lactobacillus | delbrueckii | bulgaricus | 1.07 |
| NRIC1682 | Lactobacillus | delbrueckii | lactis | 1.12 |
| NRIC0129 | Lactobacillus | fermentum | | 1.00 |
| NRIC0131 | Lactobacillus | fermentum | | 1.19 |
| NRIC0132 | Lactobacillus | fermentum | | 1.03 |
| NRIC0135 | Lactobacillus | fermentum | | 1.02 |
| NRIC0139 | Lactobacillus | fermentum | | 1.14 |
| NRIC0141 | Lactobacillus | fermentum | | 1.08 |
| NRIC0142 | Lactobacillus | fermentum | | 0.94 |
| NRIC0143 | Lactobacillus | fermentum | | 1.04 |
| NRIC0144 | Lactobacillus | fermentum | | 0.97 |
| NRIC0145 | Lactobacillus | fermentum | | 1.09 |
| NRIC0146 | Lactobacillus | fermentum | | 1.05 |
| NRIC0147 | Lactobacillus | fermentum | | 1.05 |
| NRIC1949 | Lactobacillus | fermentum | | 1.09 |
| NRIC1952 | Lactobacillus | fermentum | | 1.06 |
| NRIC1955 | Lactobacillus | fermentum | | 1.12 |
| NRIC1966 | Lactobacillus | hilgardii | | 0.94 |
| NRIC1967 | Lactobacillus | hilgardii | | 1.06 |
| NRIC1936 | Lactobacillus | paracasei | paracasei | 0.96 |
| NRIC1937 | Lactobacillus | paracasei | paracasei | 0.94 |
| NRIC1942 | Lactobacillus | paracasei | paracasei | 0.93 |
| NRIC1944 | Lactobacillus | paracasei | paracasei | 1.00 |
| NRIC1945 | Lactobacillus | paracasei | paracasei | 0.98 |
| NRIC1946 | Lactobacillus | paracasei | paracasei | 1.01 |
| NRIC1934 | Lactobacillus | paracasei | tolerans | 1.09 |
| NRIC1935 | Lactobacillus | paracasei | tolerans | 1.03 |
| NRIC1938 | Lactobacillus | paracasei | tolerans | 1.03 |

TABLE 3

| Strain No. | Genus | Species | Subsp. | IgA S.I. |
|---|---|---|---|---|
| NRIC1939 | Lactobacillus | paracasei | tolerans | 1.01 |
| NRIC1940 | Lactobacillus | paracasei | tolerans | 1.01 |
| NRIC1943 | Lactobacillus | paracasei | tolerans | 0.99 |
| NRIC1947 | Lactobacillus | paracasei | tolerans | 0.98 |
| NRIC0391 | Lactobacillus | pentosus | | 1.00 |
| NRIC0392 | Lactobacillus | pentosus | | 1.04 |
| NRIC0393 | Lactobacillus | pentosus | | 1.19 |
| NRIC0394 | Lactobacillus | pentosus | | 1.15 |
| NRIC1919 | Lactobacillus | plantarum | | 1.32 |
| NRIC1920 | Lactobacillus | plantarum | | 1.08 |
| NRIC1921 | Lactobacillus | plantarum | | 1.14 |
| NRIC1922 | Lactobacillus | plantarum | | 1.37 |
| NRIC1923 | Lactobacillus | plantarum | | 0.96 |
| NRIC1957 | Lactobacillus | plantarum | | 1.01 |
| NRIC1958 | Lactobacillus | plantarum | | 1.31 |
| NRIC1715 | Lactobacillus | reuteri | | 0.95 |
| NRIC1974 | Lactobacillus | reuteri | | 1.16 |
| NRIC1980 | Lactobacillus | reuteri | | 1.31 |
| NRIC1599 | Lactobacillus | sakei | | 0.97 |
| NRIC1600 | Lactobacillus | sakei | | 1.52 |
| NRIC1601 | Lactobacillus | sakei | | 1.07 |
| NRIC1602 | Lactobacillus | sakei | | 1.37 |
| NRIC1603 | Lactobacillus | sakei | | 1.03 |
| NRIC1575 | Leuconostoc | lactis | | 0.85 |
| NRIC1576 | Leuconostoc | lactis | | 0.92 |
| NRIC1578 | Leuconostoc | lactis | | 1.00 |
| NRIC1580 | Leuconostoc | lactis | | 1.03 |
| NRIC1582 | Leuconostoc | lactis | | 0.93 |
| NRIC1750 | Leuconostoc | lactis | | 1.03 |
| NRIC1087 | Leuconostoc | mesenteroides | mesenteroides | 1.33 |
| NRIC1507 | Leuconostoc | mesenteroides | mesenteroides | 1.02 |
| NRIC1541 | Leuconostoc | mesenteroides | mesenteroides | 0.90 |
| NRIC0124 | Pediococcus | acidilactici | | 0.93 |
| NRIC0122 | Pediococcus | pentosaceus | | 1.03 |
| NRIC0123 | Pediococcus | pentosaceus | | 0.96 |
| NRIC1913 | Pediococcus | pentosaceus | | 1.62 |
| NRIC1914 | Pediococcus | pentosaceus | | 1.05 |
| NRIC1915 | Pediococcus | pentosaceus | | 1.28 |
| NRIC0001 | Saccharomyces | cerevisiae | | 1.04 |
| NRIC0002 | Saccharomyces | cerevisiae | | 1.02 |
| NRIC0004 | Saccharomyces | Cerevisiae | | 1.12 |

TABLE 4

| Strain No. | Genus | Species | Subsp. | IgA S.I. |
|---|---|---|---|---|
| NRIC0005 | Saccharomyces | cerevisiae | | 1.00 |
| NRIC0006 | Saccharomyces | cerevisiae | | 1.01 |
| NRIC0007 | Saccharomyces | cerevisiae | | 0.98 |
| NRIC0008 | Saccharomyces | cerevisiae | | 0.97 |
| NRIC0009 | Saccharomyces | cerevisiae | | 0.98 |
| NRIC0011 | Saccharomyces | cerevisiae | | 1.03 |
| NRIC0013 | Saccharomyces | cerevisiae | | 0.95 |
| NRIC0014 | Saccharomyces | cerevisiae | | 0.94 |
| NRIC0015 | Saccharomyces | cerevisiae | | 1.04 |
| NRIC0016 | Saccharomyces | cerevisiae | | 0.88 |
| NRIC0059 | Saccharomyces | cerevisiae | | 1.12 |
| NRIC0060 | Saccharomyces | cerevisiae | | 1.11 |
| NRIC1412 | Saccharomyces | cerevisiae | | 1.00 |
| NRIC1414 | Saccharomyces | cerevisiae | | 1.03 |
| NRIC1415 | Saccharomyces | cerevisiae | | 0.85 |
| NRIC1417 | Saccharomyces | cerevisiae | | 0.97 |
| NRIC1461 | Saccharomyces | cerevisiae | | 0.92 |
| NRIC1465 | Saccharomyces | cerevisiae | | 1.00 |
| NRIC1466 | Saccharomyces | cerevisiae | | 1.07 |
| NRIC1624 | Saccharomyces | cerevisiae | | 0.91 |
| NRIC1478 | Saccharomyces | cerevisiae | | 0.91 |
| NRIC1482 | Saccharomyces | cerevisiae | | 0.94 |
| NRIC1483 | Saccharomyces | cerevisiae | | 1.24 |
| NRIC1484 | Saccharomyces | cerevisiae | | 0.87 |
| NRIC1485 | Saccharomyces | cerevisiae | | 0.95 |
| NRIC1486 | Saccharomyces | cerevisiae | | 1.04 |
| NRIC1487 | Saccharomyces | cerevisiae | | 0.91 |
| NRIC1488 | Saccharomyces | cerevisiae | | 0.91 |
| NRIC1489 | Saccharomyces | cerevisiae | | 0.84 |
| NRIC1490 | Saccharomyces | cerevisiae | | 0.88 |
| NRIC1811 | Saccharomyces | cerevisiae | | 1.03 |

As shown in Tables 1 to 4, with the IgA production of the PBS control being taken as 1, the mean S.I. of the positive control is 13.1, which indicates a strong enhancement of IgA production. This culture system was thus confirmed to be useful for evaluating IgA production from Peyer's patch cells.

A comparison of various lactic acid bacteria in terms of IgA production-inducing capabilities indicates that the lactic acid bacteria of the invention, *Lactobacillus* ONRIC b0239 and *Lactobacillus* ONRIC b0240, have S.I. values of 5.61 and 6.31, respectively, and thus have remarkably higher IgA production-inducing capabilities as compared to other strains, whose S.I. values are 0.8-1.4.

IgA inhibits pathogenic bacterial invasion, neutralizes viruses and toxins, and inhibits dietary allergen invasion. Enhancement of such IgA is important for host defense.

Test Example 2

In this Example, the IgA production-inducing capabilities of *Lactobacillus* ONRIC b0240 (FERM BP-10065) were tested in vivo in the following manner.

(1) Experimental Animals and their Feeding

Fifty male 8 week-old BALB/c mice were purchased and quarantined for one week. During the quarantine period and subsequent test period, an MF solid diet (product of Oriental Yeast Co. Ltd.) and tap water were supplied ad libitum.

After the quarantine period, the mice were divided into 3 groups, i.e., a physiological saline administration group (15 mice), a *Lactobacillus* ONRIC b0240 (viable cells) administration group (15 mice), and a *Lactobacillus* ONRIC b0240 (non-viable cells) administration group (15 mice).

(2) Preparation of *Lactobacillus* ONRIC b0240 for Oral Administration

*Lactobacillus* ONRIC b0240 (viable and non-viable cells) for oral administration were prepared by the following methods.

Viable Cells:

*Lactobacillus* ONRIC b0240 was cultured in MRS medium until the stationary growth phase was reached and the resulting culture was centrifuged at 3,500 rmp for 10 minutes (4° C.). The cells were subjected to centrifugal washing with physiological saline twice and suspended in physiological saline to achieve a concentration of $4 \times 10^9$ CFU/mL.

Non-Viable Cells:

The viable cell suspension thus obtained was autoclaved (heated at 121° C. for 15 minutes) and then ultrasonicated using a washing sonicator (BRANSON 2510) for 45 minutes.

(3) Test Method

The *Lactobacillus* ONRIC b0240 (viable cells) prepared in (2) were orally administered to 15 mice (5+5+5=15 mice) of the *Lactobacillus* ONRIC b0240 (viable cells) administration group for 7 days (5 mice), 14 days (5 mice), or 21 days (5 mice) every morning in an amount of $10^9$ CFU/250 µL/mouse/day. Likewise, the *Lactobacillus* ONRIC b0240 (non-viable cells) prepared in (2) were orally administered to 15 mice of the *Lactobacillus* ONRIC b0240 (non-viable cells) administration group for 7 days (5 mice), 14 days (5 mice), or 21 days (5 mice). After their respective administration periods, the mice of each group were sacrificed by decapitation to collect their blood in tubes, which was centrifuged at 4° C. at 3,000 rotations/minute for 10 minutes to obtain serums. Peyer's patch cells were prepared by the following method. After sacrificing the mice in each group, the small intestine was removed and dissected with opthalmological scissors to remove Peyer's patches from the small intestine. The Peyer's patches were cooled with ice in a 24-well microtiter plate containing an incomplete medium (RPMI1640 containing 10 mg of Gentamycin). The resulting culture was passed through a mesh to prepare a single cell suspension and washed well with 5 mL of the incomplete medium. The obtained cell suspension was filtered and centrifuged at 4° C. at 1,000 rotations/minute for 10 minutes. After centrifugation, the culture supernatant was removed by suction and the precipitate was suspended in 5 mL of the incomplete medium. After the above procedure consisting of washing, filtration, centrifugation, and suction removal of the culture supernatant was repeated once, the resulting precipitate was used as Peyer's patch cells.

The control mice (15 mice) in the physiological saline administration group were housed without being given *Lactobacillus* ONRIC b0240 (viable and non-viable cells), and their serums and Peyer's patch cells were prepared in the same manner as above, 7 days (5 mice), 14 days (5 mice), or 21 days (5 mice) after the start of the test.

IgA Production Test

The Peyer's patch cells (precipitates) thus prepared were suspended in 0.5 mL of a complete medium (RPMI1640 containing 2 mM L-glutamine, 50 µM mercaptoethanol, 100 U/mL penicillin, 100 µg/mL streptomycin, and 10% FBS) and adjusted to achieve a cell concentration of $2 \times 10^6$ cells/mL. After the number of viable cells was counted, 100 µL portions of the cell suspensions were inoculated into each well of a 96-well cell culture plate.

The amount of IgA produced by Peyer's patch cells was evaluated by two methods, i.e., a method comprising culturing Peyer's patch cells as are and measuring the amount of IgA produced, and a method comprising culturing Peyer's patch cells in a culture system containing *Lactobacillus* ONRIC b0240 (non-viable cells) as a Peyer's patch cell stimulating substance and measuring the amount of IgA produced. The conditions used in the latter method are considered to be closer to the actual in vivo environment. More specifically, when the *Lactobacillus* ONRIC b0240 (viable or non-viable cells) are orally administered in this test, the ingested lactic acid bacteria are expected to provide some stimulus to the Peyer's patch cells.

The *Lactobacillus* ONRIC b0240 (non-viable cells) as a Peyer's patch cell-stimulating substance were prepared according to the following method.

*Lactobacillus* ONRIC b0240 (Non-Viable Cells) for Peyer's Patch Stimulation

The suspension of *Lactobacillus* ONRIC b0240 (viable cells) for oral administration prepared above was further diluted with a phosphoric acid buffer to achieve a concentration of $10^7$ CFU/mL (turbidity: 0.275 at 660 nm) and the resulting bacterial cell suspension was autoclaved (heated at 121° C. for 15 minutes) and then ultrasonicated using a washing sonicator (BRANSON 2510) for 45 minutes.

In the method using the Peyer's patch cell-stimulating substance, 10 µL of *Lactobacillus* ONRIC b0240 (non-viable cells) for Peyer's patch cell stimulation was added to each well and then 100 µL of FCS-free RPMI1640 was added to each well to culture Peyer's patch cells at 37° C. in the presence of 5% $CO_2$ for 7 days. In the method not using the Peyer's patch cell-stimulating substance, 10 µL of physiological saline was added to each well in place of the *Lactobacillus* ONRIC b0240 (non-viable cells) and the same procedure as above was followed to culture Peyer's patch cells.

(4) Measurement

The culture supernatants were isolated from the cell culture solutions by centrifugation and frozen for storage at −80° C. until they were used to measure the total concentrations of IgA produced in the culture supernatants.

The total IgA concentrations of the culture supernatants and total IgG concentrations of the serums were determined by ELISA using commercially available kits.

(5) Results

Figure 2:
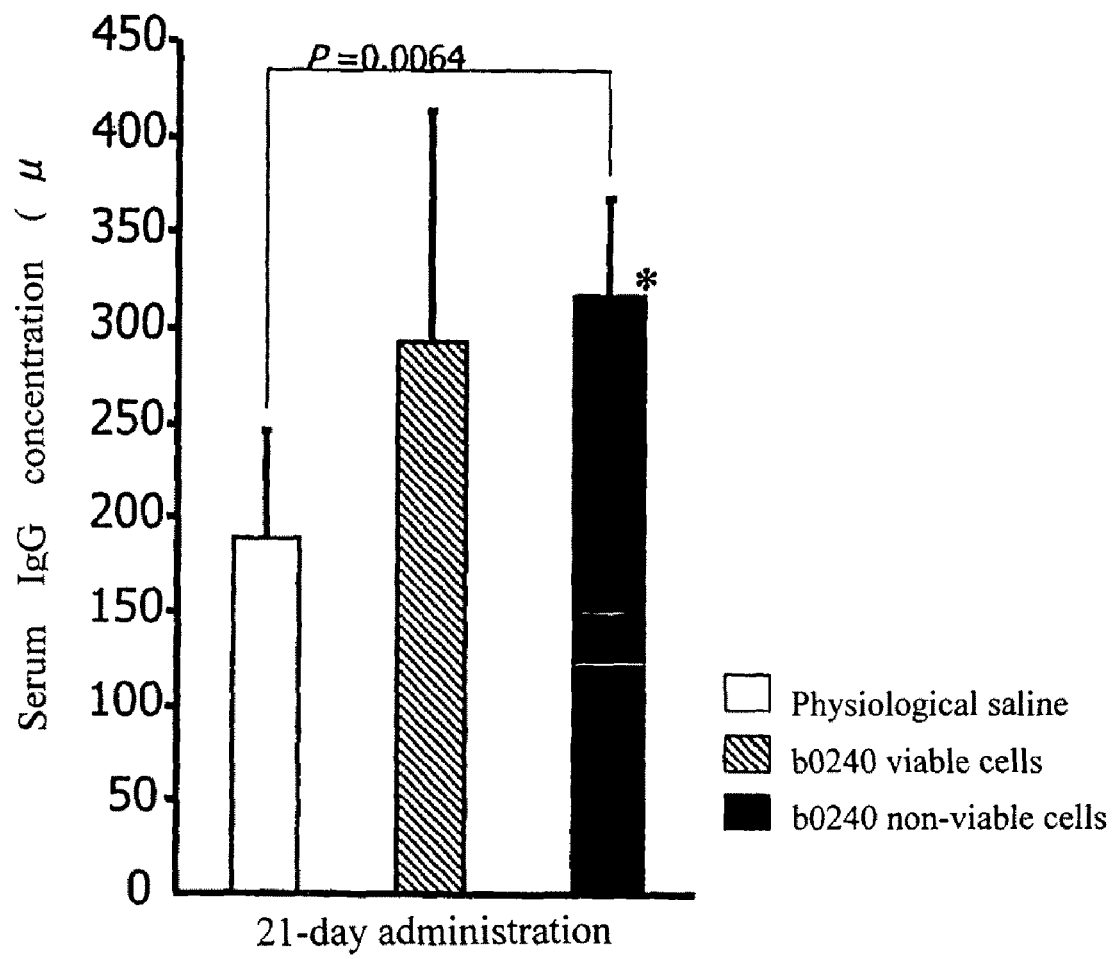
FIG. 2 is a graph showing the influence of the administration of *Lactobacillus* ONRIC b0240 on IgG production.

FIGS. 1 and 2 show the results (IgA concentration and IgG concentration, respectively).

FIG. 1 is a bar chart showing the IgA concentrations of the culture supernatants (µg/mL). In FIG. 1, white bars show the results of the control physiological saline administration group (indicated as "physiological saline"). Hatched bars show the results of the *Lactobacillus* ONRIC b0240 (viable cells) administration group (indicated as "b0240 viable cells"). Black bars show the results of the *Lactobacillus* ONRIC b0240 (non-viable cells) administration group (indicated as "b0240 non-viable cells"). "No stimulus" indicates those cases in which Peyer's patch cells derived from the mice in each group were cultured in a culture system not containing the *Lactobacillus* ONRIC b0240 (non-viable cells). "Cellular stimulation" indicates those cases in which Peyer's patch cells derived from the mice in each group were cultured under the stimulation of the *Lactobacillus* ONRIC b0240 (non-viable cells) by adding the *Lactobacillus* ONRIC b0240 to a culture system. The results obtained using 5 mice in each group are presented as mean standard deviation (Mean±SD). The p values shown above the results represent significance levels relative to the control in a Student t-test.

The results shown in FIG. 1 clearly indicate the following:
(1) 7-Day Administration:
In the case of cellular stimulation, the *Lactobacillus* ONRIC b0240 (non-viable cells) administration group showed a significantly higher value compared to the control physiological saline administration group (p=0.010).
(2) 14-Day Administration:
In the case of no stimulation, the *Lactobacillus* ONRIC b0240 (non-viable cells) administration group showed a significantly higher value (p=0.048) (black bar of no stimulus) than the control (no stimulation after the administration of physiological saline).
In the case of cellular stimulation, both the *Lactobacillus* ONRIC b0240 (non-viable cells and viable cells) administration groups showed significantly higher values (p=0.034 and p=0.002, respectively) than the control (physiological saline administration).
(3) 21-Day Administration:
In the case of no stimulation, the *Lactobacillus* ONRIC b0240 (non-viable cells) administration group showed a significantly higher value (p=0.047) than the control group.
In the case of cellular stimulation, both the *Lactobacillus* ONRIC b0240 (non-viable cells and viable cells) administration groups showed significantly high values (p=0.015 and p=0.005, respectively) than the control group.

FIG. 2 is a bar graph showing the influence of 21-day administration of *Lactobacillus* ONRIC b0240 on IgG production. The serum IgG concentration (μg/mL) is plotted on the ordinate.

The results shown in FIG. 2 clearly indicate that the *Lactobacillus* ONRIC b0240 (non-viable cell) administration group showed a significantly higher serum IgG concentration (p=0.0064) than the control (physiological saline administration); and the *Lactobacillus* ONRIC b0240 (viable cells) administration group also showed a significantly higher serum IgG concentration than the control (physiological saline administration).

The above results are considered to be brought about as follows: *Lactobacillus* ONRIC b0240 induce mucosal immune responses by stimulating immunocompetent cells in Peyer's patches or intestinal epithelial cells and the surrounding immunocompetent cells, which ultimately enhances the total IgA production of Peyer's patch cells. The results also clearly show that the administration of *Lactobacillus* ONRIC b0240 can enhance not only IgA but also serum IgG.

These suggest that the intake of ONRIC lactic acid bacteria stimulates not only mucosal immunity but also systemic immunity so that in vivo immune responses are doubly stimulated, thus enabling a host organism to be defended from the inside and outside. Since not only viable cells but also non-viable cells exhibit such an activity, ONRIC lactic acid bacteria is expected to be useful in new probiotic methods such as oral vaccines.

Test Example 3

This Example is to demonstrate the effectiveness of ONRIC lactic acid bacteria for preventing lower respiratory tract influenza infection.

To investigate the IgA-based infection protective effects of ONRIC lactic acid bacteria, lower respiratory tract infected model mice in which influenza viruses (IFV) reached the lower respiratory tract were used, and infection protective effects of intake of the fermented composition prepared using *Lactobacillus* ONRIC b0240 were evaluated using the number of days of survival after infection as an index. The test was carried out in the following manner.
(1) Experimental Animals
5-week old SPF/VA/VAF inbred female mice (strain: BALB/c AnNCrj) purchased from Charles River Japan Inc. were quarantined under the conditions shown below for 4 days and divided into 3 groups (a distilled water group, a milk group, and a *Lactobacillus* ONRIC b0240-containing fermented milk group) in such a manner that the average body weight of each group was essentially the same.

Feed supply: MF solid diet (product of Oriental Yeast Co. Ltd.)/free feeding
Water supply: tap water/feeding ad libitum from bottle
Environment: temperature, 23±2° C.; humidity, 60±10%
Lighting hours: light period, 7:00 to 19:00;
dark period, 19:00 to 7:00
(2) Test Method
Test substances ((1) distilled water, (2) cows' milk or (3) fermented milk containing *Lactobacillus* ONRIC b0240) were administered with the MF solid diet (product of Oriental Yeast Co. Ltd.) to the mice of each group (n=45) for 2 weeks.

The test cows' milk was prepared by diluting LL milk (Oaso cows' milk; product of Rakunou Mothers (Kumamoto Dairy Cooperative Association) to 75% with distilled water. The test fermented milk containing *Lactobacillus* ONRIC b0240 was prepared using *Lactobacillus* ONRIC b0240 suspended in 10% aqueous skim milk solution and frozen for storage at −80° C. as a starter. The starter (viable cell count: $10^8$ cfu) was added to 1 liter of cows' milk and fermented at 33° C. for 16 hours to achieve a cell content of $5 \times 10^7$ cfu/mL, which was diluted to 75% with distilled water.

The test substances were fed ad libitum via water supply bottle. Feed intake was calculated from weight reduction of the test substances by comparing initial weights of the test substances with those after feeding.

Two weeks after the start of intake, the mice in each group were anesthetized by "Ketalar" (ketamine hydrochloride) and infected with IFV by administering 50 μL of an IFV solution in a concentration of 10, $10^2$ or $10^3$ pfu/50 μL PBS/mouse (15 mice each) via one nasal cavity for nasal inoculation. The survival or death of the mice in each group was checked each day. From the time of infection to death confirmation, the mice had free access to the test substances.

The IFV: A/PR/8/34/H1N1 strain stored at the Microorganism Research Institute of Otsuka Pharmaceutical Co., Ltd. was used as the IFV strain. The strain was suspended in MEM containing 0.1% BSA and 10 mM HEPES and diluted with PBS(+) to achieve a viral content of 10 to $10^3$ pfu/50 μL, thus providing a viral solution for IFV inoculation. PBS(+) was prepared by dissolving 9.55 g of PBS (−) powder (product of Kojin-Bio Co.), 100.00 mg of anhydrous $CaCl_2$ and 46.90 mg of anhydrous $MgCl_2$ in distilled water to make a volume of 1,000 mL.
Results
The number of days of survival after the nasal inoculation of IFV of mice in each group was checked by observation each morning (8:30-9:00) and evening (17:30-18:00), i.e., twice each day.

When the virus was inoculated in a concentration of $10^2$ pfu/mouse, all the mice in the control group (distilled water administration group) and the comparative group (milk administration group) were dead by day 7. When the virus was inoculated in a concentration of $10^3$ pfu/mouse, all the mice in the two groups were dead by the evening of day 6. In contrast, the *Lactobacillus* ONRIC b0240-containing fermented milk administration group showed a tendency to extend the survival period of the mice over that of the control group.

When the virus was inoculated in a concentration of 10 pfu/mouse, 70% or more of the mice were still surviving in all the groups on day 14; with 86.7% of the mice in the *Lactobacillus* ONRIC b0240-containing fermented milk administration group surviving, thus showing a tendency to extend the survival rate compared to that (80%) of the control group.

The weight of the mice in each group was measured using an electronic scale every two days from the start of intake of the test substances to the day of infection, and then measured every morning thereafter (8:30-9:00). Measurement was carried out on the mice surviving on each measurement day and the average of all the measurements on the mice in the same group is shown as the obtained value.

In all the groups, a slight weight reduction was observed from day 2. The weight change tendency was similar among all the groups and no substantial differences were observed.

Consideration

From the results of this test and test results shown in Test examples 1 and 2, it is concluded that the ONRIC lactic acid bacteria and fermented composition containing the same have protective effects against IFV infection.

The present invention provides tea-based fermentation beverages and tea beverages containing ONRIC lactic acid bacteria capable of stimulating mucosal immunity and enhancing IgA production. The intake thereof can inhibit the invasion of pathogenic microorganisms through mucosa, thus providing host-protective effects.

Test Example 4

This Example is to demonstrate the effectiveness of the inoculation with ONRIC lactic acid bacteria (non-viable cells) for preventing lower respiratory tract influenza infection.

(1) Test Substance

*Lactobacillus* ONRIC b0240 (non-viable cells) were used as a test substance.

(2) Experimental Animals 5-week old BALB/c/Cr Slc (SPF) female mice purchased from Japan SLC, Inc. were quarantined under the conditions shown below for 7 days and divided into groups.

Feed supply: CRF-1 solid diet (product of Oriental Yeast Co. Ltd.)/free feeding

Water supply: tap water sterilized in an autoclave at 123° C. to 124° C. for 100 minutes/feeding ad libitum from bottle Environment: temperature, 23±2° C.; humidity, 55±15%

Ventilation: 15 times/hour

Lighting hours: light period, 8:00-20:00; dark period, 20:00-8:00

(3) Preparation of Viruses

MDCK cells (Dog kidney cells; RCB0995 strain) were infected with Influenza virus A (IFVA: PR8 strains) freeze-dried and preserved in an ultra-low temperature refrigerator) at M.O.I. (Multiplicity of infection) of 0.01 in cell culture media (10% FBS containing Eagle MEM (Gibco), and cultured at 37° C. for 72 hours in the presence of 5% $CO_2$ (passage 1). Cells continuously cultured for 5 passages were mass-produced, and subjected to sucrose gradient centrifugation to separate and purify a viral liquid. The viral liquid was partitioned into 1 mL portions, and stored at −80° C. in an ultra-low temperature refrigerator until the start of experiments. Part of the virus liquid was diluted 10 fold to confirm cell degeneration, thereby determining the virus titer ($TCID_{50}$).

(4) Test Method (4-1) Grouping

The mice were divided into 6 groups (4 virus-inoculated groups and 2 non-virus-inoculated groups). The concentration of inoculated virus of the 4 groups was $10^{7.5}$ $TCID_{50}$/mL. 10 mice in a group securely inoculated with virus were assigned to each group. The mice were given with an identification number, and were assigned randomly. The number of non-virus-inoculated mice was also 10.

(4-2) Administration of Test Substances

After the quarantine and inspection were complete, 0.2 mL of test substance was forcibly administered orally to each 6-week old BALB/c female mouse, which had been preliminarily fed for one week, once per day throughout the test period. The concentrations of the test substances were selected so that the amounts of the test substance administered were 500, 100, or 20 mg/mL per kg body weight. Physiological saline was separately administered to negative controls in the same manner.

(4-3) IFVA Inoculation 0.2 mL of 20-fold-diluted ketamine hydrochloride (50 mg/mL, manufactured by Sankyo Co., Ltd.) and 0.1 mL of 20-fold-diluted droperidol (2.5 mg/mL, manufactured by Sankyo Co., Ltd.) per 20 g of animal weight were administered intramuscularly to the hind leg of each 6-week old BALB/c female mouse in the order, of the number assigned to each mouse. The mice had been continuously administered orally with the test substance or physiological saline for three weeks. After the injection, the mice were subjected to general anesthesia. Under general anesthesia, 50 μL of IFVA prepared in (3) above was nasally inoculated to the right nasal cavity of each mouse. Separately, 50 μL of physiological saline was injected to the non-virus-inoculated groups.

(4-4) Determination of Survival Rate

The mice were checked by observation for two weeks after the inoculation of IFVA. The survival rate was determined by multiplying by 100 the value obtained by dividing the number of surviving animals inoculated with IFVA by the total number of each group.

(5) Statistical Application

Significance of the difference between the experimental control groups and each group administered with the test substance was analyzed by Kruskal-Wallis H-test or Mann-Whitney U-test. The significance level was less than 5%. The significance of the difference for survival (period of time) during the observation period was analyzed by Fisher's test.

(6) Results

The results are shown in Table 5.

TABLE 5

| | Dosage (amount) of *Lactobacillus* ONRIC b0240 (mg/kg body weight) | Number of mice | Survival rate | Survival length (days) |
|---|---|---|---|---|
| IFVA-inoculated groups | 500 | 10 | 8/10 (80.0%) | 13.1 |
| | 100 | 10 | 3/10 (30%) | 9.2 |
| | 20 | 10 | 0/10 (0.0%) | 8.5 |
| | (physiological saline) | 10 | 0/10 (0.0%) | 8.5 |

TABLE 5-continued

| Dosage (amount) of Lactobacillus ONRIC b0240 (mg/kg body weight) | Number of mice | Survival rate | Survival length (days) |
|---|---|---|---|
| Non-IFVA-inoculated groups | 500 (physiological saline) | 10 | 10/10 (100.0%) | 14.0 |
|  |  | 10 | 10/10 (100.0%) | 14.0 |

For the virus-infected animals, the survival rate and the average survival length of the physiological saline administration group were 0% and 8.5 days, respectively. In contrast, the survival rate and the average survival length of the groups administered with the test substance, i.e., a 500 mg/kg administration group, a 100 mg/kg administration group, and a 20 mg/kg administration group were 80.0% and 13.1 days, 30.0% and 9.2 days, and 0% and 8.5 days, respectively. For the survival length during the observation period after viral infection and the survival rate at the end of the observation period, the group administered with 500 mg/kg of the test substance showed significantly higher value compared with the control group (P=0.0002 and P=0.0007, respectively). For animals that had not been infected with virus, the survival rate and the average survival length of the group administered with the test substance and the group not administered with the test substance were both 100% and 14.0 days.

Test Example 5

This test was conducted to show the effect of continuous administration of ONRIC lactic acid bacteria (non-viable cells) on the amount of IgA production in human saliva.

20 adult females were subjected to the test, and divided into two groups, i.e., a group administered with water (control group) and a group administered with *Lactobacillus* ONRIC b0240 (non-viable cells) ($2\times10^9$ CFU equivalents/day) based on the total S-IgA amount in human saliva during the screening.

During the test, water or water containing *Lactobacillus* ONRIC b0240 (bacterial cell count: $2\times10^9$ CFU equivalents, 200 ml/day) were administered. Before and after the test substance was administered, the total S-IgA amounts in human saliva were measured as follows.

The mouth was washed with distilled water at a given time on the saliva collection day. Five minutes after the washing, saliva was collected with salivettes for one minute and weighed out. According to the saliva secretion amount, this step was repeated two or three times. During the collection, the collection period was accurately measured with a timer and recorded. The obtained saliva was cool-stored at 4° C. until centrifugation. The sample was centrifuged at 2500 rpm for 10 minutes on the same day, and the precipitate was removed. When the amount of supernatant obtained was small, another centrifugation was carried out. The supernatant was collected in a 1.5-ml microtube, and freeze-preserved at −30° C. until measurement. Measurement was conducted using a sample diluted 2000-fold with a blocking liquid (fish gelatin (SIGMA, St. Louis, Mo.) 1 g/50 ml in PBS including 0.05% polyoxyethylene sorbitan monolaurate (Tween 20 equivalent, Nakalai Tesque Inc., Kyoto). The IgA concentration was determined by ELISA (preliminary antibody: rabbit anti-human IgA (DAKO, Denmark), secondary antibody: HRP labeled rabbit anti-human IgA (DAKO), standard antibody: PURIFIED HUMAN SECRETORY IgA (Cappel, Aurora, Ohio). The total S-IgA amount was calculated by multiplying the saliva secretion amount per minute by the S-IgA concentration.

The amount of the total S-IgA in the saliva increase during the test was obtained by subtracting the total IgA amount in the saliva before administered with the test substance from the total S-IgA amount in the saliva on the $21^{st}$ day after administered with the test substance. The obtained results are shown in Table 3. For the amount of the total S-IgA in the saliva increase during the test, the group (52.21±24.41 µg) administered with *Lactobacillus* ONRIC b0240 (non-viable cells) ($2\times10^9$ cfu equivalent/day) showed a significantly higher value compared with the group (−21.81±28.33 µg) administered with water. The difference was statistically significant (p=0.0001).

The invention claimed is:

1. A tea-based fermentation beverage comprising a tea-based fermentation liquid with at least one species of lactic acid bacteria selected from the group consisting of *Lactobacillus* ONRIC b0239 (FERM BP-10064) and *Lactobacillus* ONRIC b0240 (FERM BP-10065), wherein the lactic acid bacteria concentration is about $10^4$ cfu/ml to about $10^8$ cfu/ml.

2. The tea-based fermentation beverage according to claim 1, further comprising a tea extract.

3. The tea-based fermentation beverage according to claim 1, wherein the lactic acid bacteria stimulate mucosal immunity in a mammal.

4. The tea-based fermentation beverage according to claim 1, wherein the lactic acid bacteria enhance IgA production in a mammal.

5. The tea-based fermentation beverage according to claim 1, wherein the lactic acid bacteria concentration is $10^5$ cfu/ml to $10^7$ cfu/ml.

6. A tea beverage comprising at least one species of lactic acid bacteria selected from the group consisting of *Lactobacillus* ONRIC b0239 (FERM BP-10064) and *Lactobacillus* ONRIC b0240 (FERM BP-10065), and a tea extract, wherein the lactic acid bacteria concentration is about $10^4$ cfu/ml to about $10^8$ cfu/ml.

7. The tea beverage according to claim 6, wherein the lactic acid bacteria stimulate mucosal immunity in a mammal.

8. The tea beverage according to claim 6, wherein the lactic acid bacteria enhance IgA production in a mammal.

9. The tea beverage according to claim 6, wherein the lactic acid bacteria concentration is $10^5$ cfu/ml to $10^7$ cfu/ml.

10. A process for producing the tea-based fermentation beverage according to claim 1, comprising the step of culturing, in a tea-containing medium, at least one species of lactic acid bacteria selected from the group consisting of *Lactobacillus* ONRIC b0239 (FERM BP-10064) and *Lactobacillus* ONRIC b0240 (FERM BP-10065).

11. The process according to claim 10, further comprising the step of adjusting the lactic acid bacteria concentration of the tea-based fermentation beverage to $10^4$ cfu/ml to $10^8$ cfu/ml.

12. The process according to claim 10, wherein the tea-containing medium is a tea extract that may contain an optional component or components and has a tea-derived Brix of 0.10 to 0.50, and wherein the culturing is performed at 25° C. to 50° C. for 12 hours to 32 hours.

13. The process according to claim 10, wherein the tea-containing medium is a tea extract that may contain an optional component or components and has a tea-derived Brix of 0.18 to 0.30, and wherein the culturing is performed at 30° C. to 40° C. for 15 hours to 20 hours.

14. A process for producing the tea-based fermentation beverage according to claim 2, comprising the steps of:
  (1) culturing, in a tea-containing medium, at least one species of lactic acid bacteria selected from the group consisting of *Lactobacillus* ONRIC b0239 (FERM BP-10064) and *Lactobacillus* ONRIC b0240 (FERM BP-10065), to obtain a tea-based fermentation liquid; and
  (2) adding a tea extract to the tea-based fermentation liquid obtained in Step (1).

15. The process according to claim 14, wherein, in Step (2), the tea extract is added to the tea-based fermentation liquid so that the final tea-based fermentation beverage has a tea-derived Brix of 0.10 to 0.50 and a lactic acid bacteria content of $10^4$ cfu/ml to $10^8$ cfu/ml.

16. A process for producing the tea beverage according to claim 6, comprising the step of mixing at least one species of lactic acid bacteria selected from the group consisting of *Lactobacillus* ONRIC b0239 (FERM BP-10064) and *Lactobacillus* ONRIC b0240 (FERM BP-10065), with a tea extract.

17. The process according to claim 16, wherein the tea extract is mixed with the lactic acid bacteria so that the final tea beverage has a tea-derived Brix of 0.10 to 0.50 and a lactic acid bacteria concentration of $10^4$ cfu/ml to $10^8$ cfu/ml.

18. A method of producing a tea-based fermentation beverage with mucosal immunity stimulating activity, comprising the step of culturing, in a tea-containing medium, at least one species of lactic acid bacteria selected from the group consisting of *Lactobacillus* ONRIC b0239 (FERM BP-10064) and *Lactobacillus* ONRIC b0240 (FERM BP-10065) to make a tea-based fermentation beverage, wherein consumption of said tea-based fermentation beverage by a human stimulates mucosal immunity in said human, and wherein the lactic acid bacteria concentration is about $10^4$ cfu/ml to about $10^8$ cfu/ml.

19. A method of producing a tea-based fermentation beverage with IgA production enhancing activity, comprising the step of culturing, in a tea-containing medium, at least one species of lactic acid bacteria selected from the group consisting of *Lactobacillus* ONRIC b0239 (FERM BP-10064) and *Lactobacillus* ONRIC b0240 (FERM BP-10065) to make a tea-based fermentation beverage, wherein consumption of said tea-based fermentation beverage by a human enhances IgA production in said human, and wherein the lactic acid bacteria concentration is about $10^4$ cfu/ml to about $10^8$ cfu/ml.

20. A method of producing a tea beverage with mucosal immunity stimulating activity, comprising the step of mixing at least one species of lactic acid bacteria selected from the group consisting of *Lactobacillus* ONRIC b0239 (FERM BP-10064) and *Lactobacillus* ONRIC b0240 (FERM BP-10065) with a tea extract to make a tea beverage, wherein consumption of said tea beverage by a human stimulates mucosal immunity in said human, and wherein the lactic acid bacteria concentration is about $10^4$ cfu/ml to about $10^8$ cfu/ml.

21. A method of producing a tea beverage with IgA production enhancing activity, comprising adding at least one species of lactic acid bacteria selected from the group consisting of *Lactobacillus* ONRIC b0239 (FERM BP-10064) and *Lactobacillus* ONRIC b0240 (FERM BP-10065) with a tea extract to make a tea beverage, wherein consumption of said tea beverage by a human enhances IgA production in said human, and wherein the lactic acid bacteria concentration is about $10^4$ cfu/ml to about $10^8$ cfu/ml.

\* \* \* \* \*